United States Patent
Zhang et al.

(10) Patent No.: US 10,983,783 B2
(45) Date of Patent: Apr. 20, 2021

(54) FIRMWARE UPDATE METHOD AND RELATED APPARATUS

(71) Applicant: Huawei Technologies Co., Ltd., Shenzhen (CN)

(72) Inventors: Yajun Zhang, Shenzhen (CN); Shuiping Long, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/643,408

(22) PCT Filed: Aug. 30, 2017

(86) PCT No.: PCT/CN2017/099640
§ 371 (c)(1),
(2) Date: Feb. 28, 2020

(87) PCT Pub. No.: WO2019/041166
PCT Pub. Date: Mar. 7, 2019

(65) Prior Publication Data
US 2020/0371777 A1  Nov. 26, 2020

(51) Int. Cl.
*G06F 8/658* (2018.01)
*G06F 21/64* (2013.01)

(52) U.S. Cl.
CPC .............. *G06F 8/658* (2018.02); *G06F 21/64* (2013.01)

(58) Field of Classification Search
CPC ... G06F 8/61; G06F 8/65; G06F 8/658; G06F 21/64
See application file for complete search history.

(56) References Cited

U.S. PATENT DOCUMENTS

| | | | |
|---|---|---|---|
| 2006/0280150 A1* | 12/2006 | Jha | H04W 8/22 370/338 |
| 2015/0143125 A1* | 5/2015 | Nix | H04L 9/0841 713/171 |
| 2015/0261521 A1* | 9/2015 | Choi | G06F 8/654 713/176 |
| 2016/0246585 A1* | 8/2016 | Li | H04L 63/0853 |

(Continued)

FOREIGN PATENT DOCUMENTS

| | | |
|---|---|---|
| CN | 101695162 A | 4/2010 |
| CN | 105916133 A | 8/2016 |

(Continued)

*Primary Examiner* — Marina Lee
(74) *Attorney, Agent, or Firm* — Conley Rose, P.C.

(57) ABSTRACT

A firmware update method including receiving a first message from an update server, where the first message includes first data and a signature of the first data, verifying the first message, and obtaining digest data included in the first data after the first message is successfully verified. The digest data includes digest information of a differential installation package between a first installation package and a second installation package and at least one of, digest information of the first installation package, or digest information of the second installation package A second message is received from the update server and includes the differential installation package. The digest data is verified, and firmware of an embedded universal integrated circuit card (eUICC) is updated based on the differential installation package after the digest data is successfully verified.

20 Claims, 11 Drawing Sheets

(56) References Cited

U.S. PATENT DOCUMENTS

| | | | | |
|---|---|---|---|---|
| 2018/0063697 A1* | 3/2018 | Li | ............................ | H04W 4/50 |
| 2020/0045544 A1* | 2/2020 | Yu | ......................... | H04L 9/3247 |
| 2020/0089488 A1* | 3/2020 | Yu | ............................ | H04W 4/60 |
| 2020/0162247 A1* | 5/2020 | Nix | ..................... | H04L 63/0838 |
| 2020/0371777 A1* | 11/2020 | Zhang | ..................... | G06F 8/658 |
| 2020/0374686 A1* | 11/2020 | Zhang | .................. | H04W 8/183 |
| 2020/0382956 A9* | 12/2020 | Yu | ......................... | H04W 12/04 |

FOREIGN PATENT DOCUMENTS

| | | | |
|---|---|---|---|
| CN | 106161336 A | | 11/2016 |
| CN | 106416306 A | | 2/2017 |
| CN | 106685653 A | | 5/2017 |
| EP | 2568639 A1 | | 3/2013 |
| KR | 101200025 B1 | | 11/2012 |

* cited by examiner

FIRMWARE UPDATE METHOD AND RELATED APPARATUS

CROSS-REFERENCE TO RELATED APPLICATIONS

This application is a U.S. National Stage of International Patent Application No. PCT/CN2017/099640 filed on Aug. 30, 2017, which is hereby incorporated by reference in its entirety.

TECHNICAL FIELD

This application relates to the field of telecommunications smart cards, and in particular, to a firmware update method and a related apparatus.

BACKGROUND

An embedded universal integrated circuit card (embedded Universal Integrated Circuit Card, eUICC) is a third generation telecommunications smart card. The eUICC can perform remote profile management, or perform local profile management (for example, profile activation, deactivation, or deletion triggered by a user of user equipment). The term eUICC originates from an embedded (embedded) UICC. The eUICC may be embedded in the user equipment in a form of a single chip, or used as a part of another single chip in the user equipment. However, this does not mean that the eUICC must be embedded in the user equipment and cannot be removed. Alternatively, the eUICC may be in a form of a removable card, like a subscriber identity (Subscriber Identification Module, SIM) card, a micro SIM card, or a nano SIM card.

In an architecture of an eUICC remote management/configuration system, a remote server includes a server providing a service for the user equipment or interacting with the user equipment, such as a subscription manager discovery server (Subscription Manager Discovery Service, SM-DS). The SM-DS is also referred to as an event management server, and may be configured to perform event registration based on an event registration request of another remote server, and when the user equipment initiates a query, send a corresponding event record to the user equipment, so that the user equipment establishes a connection to the corresponding remote server by using an address of the remote server in the event record and performs a corresponding operation. The event includes but is not limited to a subscription information set (Profile) download event, a remote profile management (Remote Profile Management, RPM) event, or a firmware update event.

Currently, when firmware of the eUICC is being updated, no security management mechanism is defined in a related standard for the eUICC firmware update. If eligibility and integrity of an update installation package are not checked before the firmware of the eUICC is updated, the update installation package may be tampered by a malicious attacker, bringing a security risk to the user equipment.

SUMMARY

Embodiments of this application disclose a firmware update method and a related apparatus to ensure security of an eUICC firmware update.

According to a first aspect, an embodiment of this application provides a firmware update method, where the method includes: first receiving, by user equipment, a first message sent by an update server, where the first message includes first data and a signature of the first data; then verifying, by the user equipment, the first message by using the first data and the signature of the first data, and after the first message is successfully verified, obtaining, by the user equipment, digest data included in the first data, where the digest data includes digest information of a differential installation package between a first installation package and a second installation package, the digest data further includes at least one of digest information of the first installation package or digest information of the second installation package, the first installation package is an installation package corresponding to a current firmware version of the user equipment, the second installation package is an installation package corresponding to an updated firmware version, and the differential installation package is an update installation package including a differential part between the first installation package and the second installation package; then receiving, by the user equipment, a second message sent by the update server, where the second message includes the differential installation package, and the differential installation package is used to update firmware of the user equipment; and finally verifying, by the user equipment, the digest data, and after the digest data is successfully verified, updating, by the user equipment, firmware of an eUICC of the user equipment based on the differential installation package included in the second message. In this embodiment of this application, before the firmware of the user equipment is updated, eligibility and integrity of the installation package for updating the firmware of the eUICC can be verified. Therefore, security of the eUICC firmware update is ensured.

In a possible embodiment, the digest data obtained by the user equipment includes the digest information of the differential installation package between the first installation package and the second installation package, and the digest information of the first installation package, and the verifying, by the user equipment, the digest data includes: first obtaining, by the user equipment, digest information of a third installation package, where the third installation package is an installation package locally stored by the user equipment and corresponding to the current firmware version of the user equipment; then comparing, by the user equipment, the digest information of the third installation package with the digest information of the first installation package, and when the digest information of the third installation package is the same as the digest information of the first installation package, determining, by the user equipment, that the digest information of the first installation package is successfully verified; and finally obtaining, by the user equipment, digest information of the differential installation package included in the second message, comparing the digest information of the differential installation package between the first installation package and the second installation package with the digest information of the differential installation package included in the second message, and when the digest information of the differential installation package between the first installation package and the second installation package is the same as the digest information of the differential installation package included in the second message, determining, by the user equipment, that the digest information of the differential installation package between the first installation package and the second installation package is successfully verified, and further determining that the digest data is successfully verified.

In a possible embodiment, the digest data obtained by the user equipment includes the digest information of the differential installation package between the first installation package and the second installation package, and the digest information of the second installation package, and the verifying, by the user equipment, the digest data includes: first obtaining, by the user equipment, digest information of the differential installation package included in the second message, and comparing the digest information of the differential installation package between the first installation package and the second installation package with the digest information of the differential installation package included in the second message; when the digest information of the differential installation package between the first installation package and the second installation package is the same as the digest information of the differential installation package included in the second message, determining, by the user equipment, that the digest information of the differential installation package between the first installation package and the second installation package is successfully verified; then obtaining, by the user equipment, a third installation package and digest information of the third installation package, where the third installation package is an installation package locally stored by the user equipment and corresponding to the current firmware version of the user equipment; then combining, by the user equipment, the third installation package with the differential installation package included in the second message, obtaining a fourth installation package, and obtaining digest information of the fourth installation package; and finally comparing, by the user equipment, the digest information of the fourth installation package with the digest information of the second installation package, and when the digest information of the fourth installation package is the same as the digest information of the second installation package, determining, by the user equipment, that the digest information of the second installation package is successfully verified, and further determining that the digest data is successfully verified.

In a possible embodiment, the digest data obtained by the user equipment includes the digest information of the differential installation package between the first installation package and the second installation package, the digest information of the first installation package, and the digest information of the second installation package, and the verifying, by the user equipment, the digest data includes: first obtaining, by the user equipment, a third installation package and digest information of the third installation package, where the third installation package is an installation package locally stored by the user equipment and corresponding to the current firmware version of the user equipment; then comparing, by the user equipment, the digest information of the third installation package with the digest information of the first installation package, and when the digest information of the third installation package is the same as the digest information of the first installation package, determining, by the user equipment, that the digest information of the first installation package is successfully verified; then obtaining, by the user equipment, digest information of the differential installation package included in the second message, comparing the digest information of the differential installation package between the first installation package and the second installation package with the digest information of the differential installation package included in the second message, and when the digest information of the differential installation package between the first installation package and the second installation package is the same as the digest information of the differential installation package included in the second message, determining, by the user equipment, that the digest information of the differential installation package between the first installation package and the second installation package is successfully verified; and finally combining, by the user equipment, the third installation package with the differential installation package included in the second message, obtaining a fourth installation package obtaining digest information of the fourth installation package, comparing the digest information of the fourth installation package with the digest information of the second installation package, and when the digest information of the fourth installation package is the same as the digest information of the second installation package, determining, by the user equipment, that the digest information of the second installation package is successfully verified, and further determining that the digest data is successfully verified.

That the digest information of the first installation package is successfully verified indicates that the first installation package is not tampered, and this can ensure validity and eligibility of the differential installation package included in the second message. That the digest information of the differential installation package between the first installation package and the second installation package is the same as the digest information of the differential installation package included in the second message indicates that the differential installation package included in the second message is not tampered, and this can ensure integrity of the differential installation package included in the second message. That the digest information of the second installation package is successfully verified indicates that the installation package obtained through combination by using the differential installation package included in the second message and the third installation package is consistent with the second installation package, and further indicates validity and eligibility of the differential installation package included in the second message. In this embodiment of this application, before the firmware of the user equipment is updated, eligibility and integrity of the installation package for updating the firmware of the eUICC can be verified. Therefore, security of the eUICC firmware update is ensured.

In a possible embodiment, the differential installation package between the first installation package and the second installation package, and the digest data are stored on the update server.

In a possible embodiment, before the receiving, by user equipment, a first message sent by an update server, the method further includes: receiving, by the user equipment, a target event record and an address of the update server that are sent by an event management server based on an eUICC identity of the user equipment, where the target event record is used to instruct the user equipment to perform a firmware update operation; and sending, by the user equipment, a third message to the update server based on the address of the update server, where the third message includes the eUICC identity; and the receiving, by user equipment, a first message sent by an update server includes: receiving, by the user equipment, the first message sent by the update server based on the eUICC identity.

In a possible embodiment, before the receiving, by the user equipment, a second message sent by the update server, the method further includes: sending, by the user equipment, a fourth message to the update server based on the pre-obtained address of the update server, where the fourth message includes second data, a signature of the second data, and eUICC information; and the receiving, by the user equipment, a second message sent by the update server includes: receiving, by the user equipment, the second message sent by the update server after the fourth message is successfully verified, where the differential installation package included in the second message is obtained by the update server by searching a pre-generated software package list based on the eUICC information.

In a possible embodiment, after the updating, by the user equipment, firmware of an eUICC based on the differential installation package included in the second message, the method further includes: obtaining and storing, by the user equipment, digest information of the installation package corresponding to the updated firmware version of the eUICC.

According to a second aspect, an embodiment of this application provides another firmware update method, where the method includes: first receiving, by an eUICC, a first message sent by a local profile assistant LPA, where the first message includes first data and a signature of the first data, and the first message is sent by an update server to the LPA; then verifying, by the eUICC, the first message by using the first data and the signature of the first data, and after the first message is successfully verified, obtaining, by the eUICC, digest data included in the first data, where the digest data includes digest information of a differential installation package between a first installation package and a second installation package, the digest data further includes at least one of digest information of the first installation package or digest information of the second installation package, the first installation package is an installation package corresponding to a current firmware version of user equipment, the second installation package is an installation package corresponding to an updated firmware version, and the differential installation package is an update installation package including a differential part between the first installation package and the second installation package; then receiving, by the eUICC, a second message sent by the LPA, where the second message includes the differential installation package, and the second message is sent by the update server to the LPA; and finally verifying, by the eUICC, the digest data, and after the digest data is successfully verified, updating, by the eUICC, firmware of the eUICC based on the differential installation package included in the second message.

In a possible embodiment, the digest data obtained by the eUICC includes the digest information of the differential installation package between the first installation package and the second installation package, and the digest information of the first installation package, and the verifying, by the eUICC, the digest data includes: first obtaining, by the eUICC, digest information of a third installation package, where the third installation package is an installation package locally stored by the eUICC and corresponding to the current firmware version of the eUICC; then comparing, by the eUICC, the digest information of the third installation package with the digest information of the first installation package, and when the digest information of the third installation package is the same as the digest information of the first installation package, determining, by the eUICC, that the digest information of the first installation package is successfully verified; and finally obtaining, by the eUICC, digest information of the differential installation package included in the second message, comparing the digest information of the differential installation package between the first installation package and the second installation package with the digest information of the differential installation package included in the second message, and when the digest information of the differential installation package between the first installation package and the second installation package is the same as the digest information of the differential installation package included in the second message, determining, by the eUICC, that the digest information of the differential installation package between the first installation package and the second installation package is successfully verified, and further determining that the digest data is successfully verified.

In a possible embodiment, the digest data obtained by the eUICC includes the digest information of the differential installation package between the first installation package and the second installation package, and the digest information of the second installation package, and the verifying, by the eUICC, the digest data includes: first obtaining, by the eUICC, digest information of the differential installation package included in the second message, and comparing the digest information of the differential installation package between the first installation package and the second installation package with the digest information of the differential installation package included in the second message; when the digest information of the differential installation package between the first installation package and the second installation package is the same as the digest information of the differential installation package included in the second message, determining, by the eUICC, that the digest information of the differential installation package between the first installation package and the second installation package is successfully verified; then obtaining, by the eUICC, a third installation package and digest information of the third installation package, where the third installation package is an installation package locally stored by the eUICC and corresponding to the current firmware version of the eUICC; then combining, by user equipment, the third installation package with the differential installation package included in the second message, obtaining a fourth installation package, and obtaining digest information of the fourth installation package; and finally comparing, by the eUICC, the digest information of the fourth installation package with the digest information of the second installation package, and when the digest information of the fourth installation package is the same as the digest information of the second installation package, determining, by the eUICC, that the digest information of the second installation package is successfully verified, and further determining that the digest data is successfully verified.

In a possible embodiment, the digest data obtained by the eUICC includes the digest information of the differential installation package between the first installation package and the second installation package, the digest information of the first installation package, and the digest information of the second installation package, and the verifying, by the eUICC, the digest data includes: first obtaining, by the eUICC, a third installation package and digest information of the third installation package, where the third installation package is an installation package locally stored by the eUICC and corresponding to the current firmware version of the eUICC; then comparing, by the eUICC, the digest information of the third installation package with the digest information of the first installation package, and when the digest information of the third installation package is the same as the digest information of the first installation package, determining, by the eUICC, that the digest information of the first installation package is successfully verified; then obtaining, by the eUICC, digest information of the differential installation package included in the second message, comparing the digest information of the differential installation package between the first installation package and the second installation package with the digest information of the differential installation package included in the second message, and when the digest information of the differential installation package between the first installation package and the second installation package is the same as the digest information of the differential installation package included in the second message, determining, by the eUICC, that the digest information of the differential installation package between the first installation package and the second installation package is successfully verified; and finally combining, by the eUICC, the third installation package with the differential installation package included in the second message, obtaining a fourth installation package, obtaining digest information of the fourth installation package, comparing the digest information of the fourth installation package with the digest information of the second installation package, and when the digest information of the fourth installation package is the same as the digest information of the second installation package, determining, by the eUICC, that the digest information of the second installation package is successfully verified, and further determining that the digest data is successfully verified.

In a possible embodiment, the differential installation package between the first installation package and the second installation package, and the digest data are stored on the update server.

In a possible embodiment, after the updating, by the eUICC, firmware of the eUICC based on the differential installation package included in the second message, the method further includes: obtaining and storing, by the eUICC, digest information of the installation package corresponding to the updated firmware version of the eUICC.

According to a third aspect, an embodiment of this application provides still another firmware update method, where the method includes: first sending, by an update server, a first message to user equipment, where the first message includes first data and a signature of the first data, the first data includes digest data, the digest data includes digest information of a differential installation package between a first installation package and a second installation package, the digest data further includes at least one of digest information of the first installation package or digest information of the second installation package, the first installation package is an installation package corresponding to a current firmware version of the user equipment, the second installation package is an installation package corresponding to an updated firmware version, and the differential installation package is an update installation package including a differential part between the first installation package and the second installation package; and then sending, by the update server, a second message to the user equipment, so that the user equipment updates firmware of an eUICC based on the digest data by using the differential installation package included in the second message.

In a possible embodiment, the update server is configured to store the differential installation package between the first installation package and the second installation package, and the digest data.

In a possible embodiment, before the sending, by an update server, a first message to user equipment, the method further includes: receiving, by the update server, a third message sent by the user equipment based on a pre-obtained address of the update server, where the third message includes an eUICC identity of the user equipment; and the sending, by an update server, a first message to user equipment includes: sending, by the update server, the first message determined by the update server based on the eUICC identity to the user equipment.

In a possible embodiment, before the sending, by the update server, a second message to the user equipment, the method further includes: receiving, by the update server, a fourth message sent by the user equipment based on the pre-obtained address of the update server, where the fourth message includes second data, a signature of the second data, and eUICC information; and verifying, by the update server, the fourth message by using the second data, the signature of the second data, and the eUICC information; and after the fourth message is successfully verified, sending, by the update server, the second message to the user equipment, where the differential installation package included in the second message is obtained by the update server by searching a pre-generated software package list based on the eUICC information.

According to a fourth aspect, an embodiment of this application provides user equipment, where the user equipment includes a receiving module, a processing module, and a sending module, where the receiving module, the processing module, and the sending module are configured to perform any method in the foregoing first aspect.

According to a fifth aspect, an embodiment of this application provides an eUICC, where the eUICC includes a communications module and a processing module, where the communications module and the processing module are configured to perform any method in the foregoing second aspect.

According to a sixth aspect, an embodiment of this application provides an update server, where the update server includes a sending module, a processing module, and a receiving module, where the sending module, the processing module, and the receiving module are configured to perform any method in the foregoing third aspect.

According to a seventh aspect, an embodiment of this application provides another user equipment, where the user equipment includes a processor, a memory, and a transceiver, where the processor, the memory, and the transceiver are configured to perform any method in the foregoing first aspect.

According to an eighth aspect, an embodiment of this application provides another eUICC, where the eUICC includes a processor, a memory, and a transceiver, where the processor, the memory, and the transceiver are configured to perform any method in the foregoing second aspect.

According to a ninth aspect, an embodiment of this application provides another update server, where the update server includes a processor, a memory, and a transceiver, and the processor, the memory, and the transceiver are configured to perform any method in the foregoing third aspect.

According to a tenth aspect, an embodiment of this application provides a computer-readable storage medium, where the computer-readable storage medium stores a computer program, the computer program includes a program instruction, and when the program instruction is executed by a computer, the computer is enabled to perform any method in the foregoing first or second or third aspect.

According to an eleventh aspect, an embodiment of this application provides a computer program product, where the computer program product includes a program instruction, and when the program instruction is executed by a computer, the computer is enabled to perform any method in the foregoing first or second or third aspect.

DESCRIPTION OF EMBODIMENTS

The following clearly and completely describes the technical solutions in the embodiments of this application with reference to the accompanying drawings in the embodiments of this application.

Figure 1:
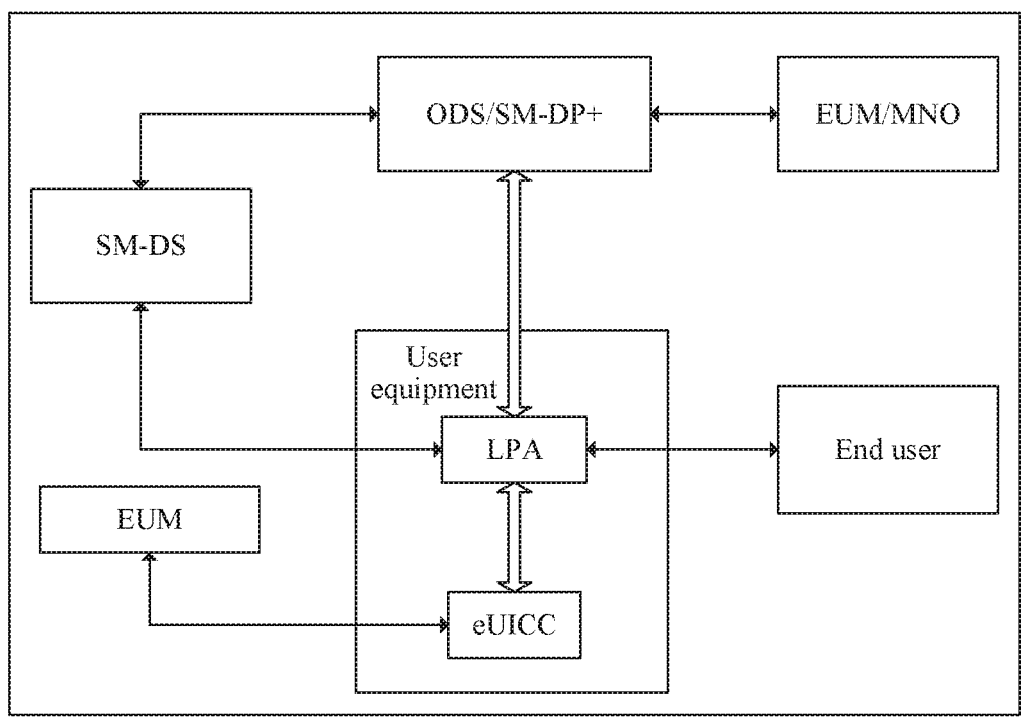
FIG. 1 is a schematic architectural diagram of an eUICC remote management/configuration system according to an embodiment of this application.

The technical solutions in the embodiments of this application are applicable to an eUICC remote management/configuration system. An architecture of the eUICC remote management configuration system in the embodiments of this application may be shown in FIG. 1. FIG. 1 is a schematic architectural diagram of an eUICC remote management/configuration system according to an embodiment of this application. An operating system delivery server (operating system delivery server, ODS) is an update server provided in the embodiments of this application. The ODS is configured to store digest data, and store a differential installation package used for updating eUICC firmware. The ODS is also configured to bind the digest data and the differential installation package used for updating the eUICC firmware, to an ETD of a specified eUICC. The digest data includes digest information of a differential installation package between a first installation package and a second installation package. The digest information further includes at least one of digest information of the first installation package or digest information of the second installation package. The first installation package is an installation package corresponding to a current firmware version of user equipment, and the second installation package is an installation package corresponding to an updated firmware version. The differential installation package used for updating the eUICC firmware includes the differential installation package between the first installation package and the second installation package. The ODS is further configured to send the digest data stored by the ODS and the differential installation package used for updating the eUICC firmware and stored by the ODS to user equipment corresponding to the EID.

A subscription manager data preparation+(subscription manager data preparation+, SM-DP+) server is another update server provided in the embodiments of this application. The SM-DP+ is configured to store digest data and store a differential installation package used for updating eUICC firmware. The SM-DP+ is also configured to bind the digest data and the differential installation package used for updating the eUICC firmware, to an EID of a specified eUICC. The SM-DP+ is further configured to send the digest data stored by the SM-DP+ and the differential installation package used for updating the eUICC firmware and stored by the SM-DP+ to user equipment corresponding to the EID. The SM-DP+ may be further configured to be responsible for preparing a profile package, and encrypting the profile package by using a profile protection key. The SM-DP+ binds the profile package encrypted by the protection key to the EID of the specified eUICC, and securely downloads the bound profile package to the user equipment. The SM-DP+ may be further configured to perform remote profile management (remote profile management, RPM) and remote eUICC management (remote eUICC management, ReM).

The ODS and the SM-DP+ may be deployed on a server of an operator (mobile network operator, MNO), an eUICC manufacturer (eUICC Manufacturer, EUM), or another party. The eUICC firmware may be a remote SIM provisioning (remote sim provisioning, RSP) supported by the eUICC, or may be an eUICC operating system. In addition, the eUICC firmware may be an eUICC operating system including a new feature (that is, a new algorithm). The MNO may obtain the eUICC identity (eUICC Identity, EID), firmware information, eUICC information, or the like of the user equipment based on subscription information of the user equipment with the MNO. The MNO may customize eUICC firmware installation packages of different firmware versions for the EUM.

An SM-DS is configured to provide one or more SM-DP+ addresses or ODS addresses for the user equipment. The user equipment may establish a connection to the SM-DP+ by using the SM-DP+ address, or the user equipment may establish a connection to the ODS by using the ODS address. The user equipment includes a local profile assistant (local profile assistant, LPA), configured to establish a connection to the SM-DP+ or the ODS to perform an eUICC firmware update operation; and may be further configured to establish a connection to the SM-DP+ to perform profile-related and eUICC-related management operations, for example, management operations such as download and installation, remote profile management, and remote eUICC management. The user equipment further includes the eUICC, configured to verify related data and installation packages in a process of updating the eUICC firmware, and further configured to implement various functions of a SIM card, and profile and eUICC configuration and management functions. The LPA and the eUICC may be two modules that are mutually separated and have a physical or logical connection relationship. For example, the LPA exists on a baseband chip, an application processor, or another hardware module of the user equipment. Alternatively, the LPA may directly exist on the eUICC. Specifically, the LPA may be a software module, or may be a plurality of software modules that exist in a distributed manner and are mutually associated. An end user (end user) is a user of the user equipment.

The SM-DP+, the SM-DS, and the ODS may be all referred to as an eUICC remote server (or remote SIM configuration server). In a possible manner, the SM-DP+ and the ODS may be deployed on a same server.

The EUM is a manufacturer manufacturing an eUICC, and is configured to produce eUICC firmware installation packages of different versions based on requirements of the MNO, where the eUICC firmware installation packages of different versions correspond to one or more eUICCs. The EUM may bind the eUICC firmware installation packages of different versions to the EID of the specified eUICC. The EUM may produce eUICC firmware installation packages of a plurality of versions, and create a firmware installation package list, where the firmware installation package list includes card manufacturer identities corresponding to different firmware versions, a firmware version of the card manufacturer, all eUICC firmware installation packages, a differential installation package between eUICC firmware installation packages of different versions, information of different firmware versions, and the like.

The EUM stores installation packages of an old firmware version and a new firmware version of the eUICC corresponding to the EID of the user equipment, that is, the first installation package and the second installation package, and further stores a differential part between the old and new firmware versions of the eUICC, that is, the differential installation package between the first installation package and the second installation package, where the differential installation package is used to update the firmware of the eUICC corresponding to the EID of the user equipment. The EUM is further configured to calculate the digest information of the differential installation package, and calculate at least one of the digest information of the first installation package or the digest information of the second installation package. The EUM may further use an EUM private key (for example, SK.EUM.ECDSA) to encrypt the digest information of the differential installation package and the differential installation package, and use the EUM private key to encrypt at least one of the digest information of the first installation package or the digest information of the second installation package. The EUM sends the EID of the specified user equipment, the digest information of the differential installation package that is encrypted or unencrypted, and the differential installation package to the ODS or the SM-DP+, and sends at least one of the digest information of the first installation package or the digest information of the second installation package to the ODS or the SM-DP+.

The user equipment UE in the embodiments of this application may be a device that provides a user with voice and/or data connectivity, a handheld device with a wireless connection function, or another processing device connected to a wireless modem. The user equipment may communicate with one or more core networks through a radio access network (Radio Access Network, RAN). The user equipment may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communications service (Personal Communications Service, PCS) phone, a cordless telephone set, a session initiation protocol (SIP) phone, a wireless local loop (Wireless Local Loop, WLL) station, or a personal digital assistant (Personal Digital Assistant, PDA). Alternatively, the user equipment may be an Internet of Things device that is connected to a sensing network layer and a transport network layer, captures data, and sends the data to a network layer, for example, may be a device such as a refrigerator, an air conditioner, or a washing machine in a smart household system. The user equipment may also be referred to as a system, a subscriber module (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

In the technical solutions in the embodiments of this application, before the user equipment and the remote server (for example, the ODS server, the SM-DP+ server, or the SM-DS server) perform information interaction, the user equipment and the remote server may first perform mutual authentication. The user equipment and the remote server may verify identity information of each other by performing mutual authentication, to ensure accuracy of objects of information interaction and ensure security of information interaction. The user equipment and the remote server may further obtain certificate information, key information, and the like of each other by performing mutual authentication. In addition, some steps in the technical solutions in the embodiments of this application may also be completed in a process of performing mutual authentication by the user equipment and the remote server. For details, refer to subsequent descriptions. For ease of understanding, the following first describes a mutual authentication process between the user equipment and the remote server.

Figure 2:
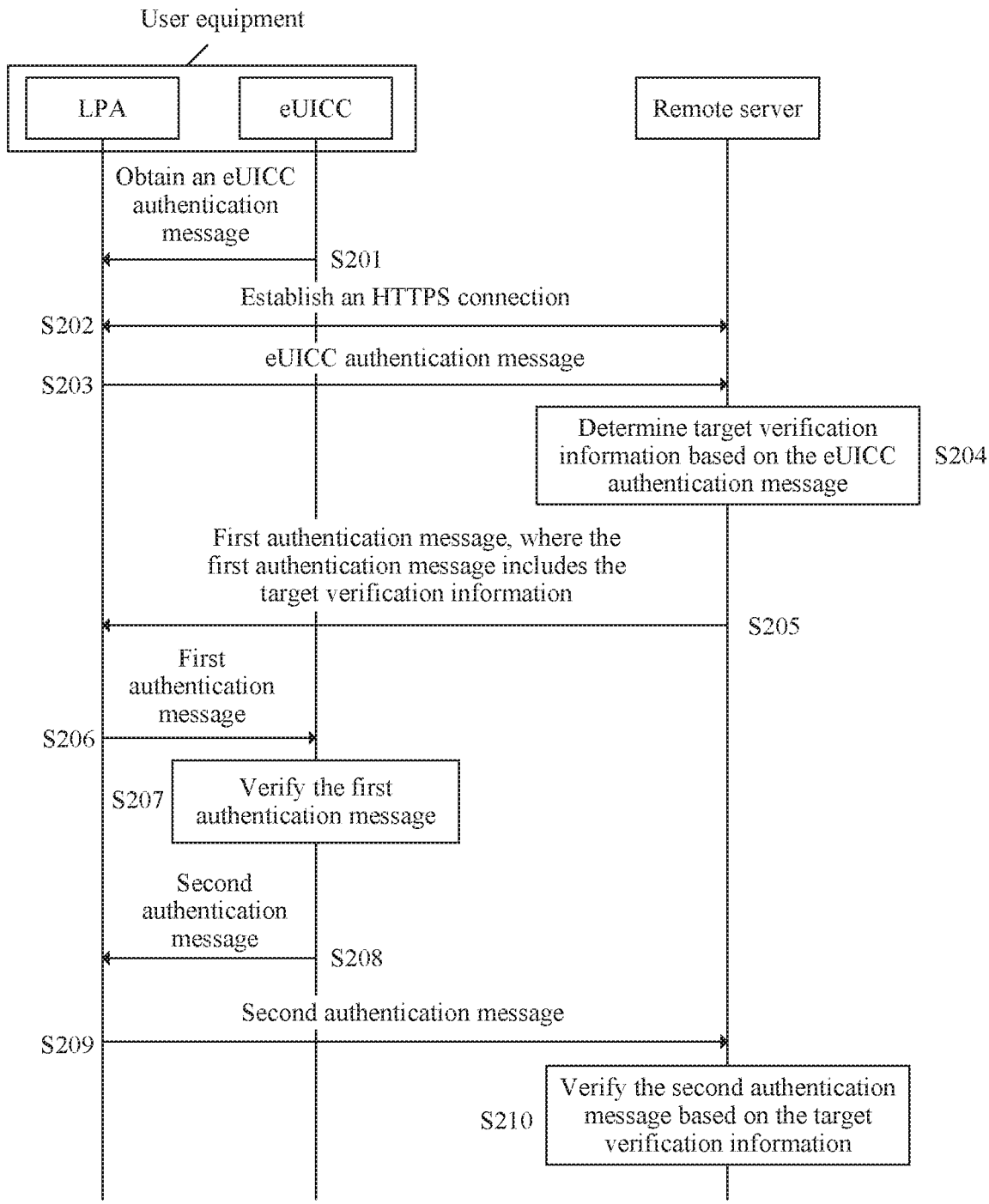
FIG. 2 is a schematic flowchart of a mutual authentication method according to an embodiment of this application.

The mutual authentication between the user equipment and the remote server is completed by the LPA and the eUICC of the user equipment in cooperation. The following uses the LPA and the eUICC as independent execution bodies to describe a specific implementation process of implementing a mutual authentication method by the user equipment. It should be understood that, after interaction steps between the LPA and the eUICC (that is, an internal interaction process of the user equipment) are omitted, operation steps performed by the LPA and the eUICC are operation steps performed by the user equipment. FIG. 2 is a schematic flowchart of a mutual authentication method according to an embodiment of this application.

S201. An LPA obtains an eUICC authentication message from an eUICC.

In this embodiment of this application, the eUICC authentication message obtained by the LPA from the eUICC includes initial eUICC information (for example, euiccInfo), where the initial eUICC information may include a public key identifier list for verification (for example, euiccCiPKIdListForVerification) and a public key identifier list for signing (for example, euiccCiPKIdListForSigning), and the initial eUICC information may also include an eUICC identity. The public key identifier list for verification and the public key identifier list for signing may be the same or may be different.

In some feasible implementations, the LPA may further obtain an eUICC random number (for example, an eUICC Challenge) from the eUICC. Before the LPA obtains the eUICC random number from the eUICC, the method further includes: the eUICC generates the eUICC random number.

S202. The LPA establishes an HTTPS connection to a remote server.

In this embodiment of this application, the LPA establishes a hypertext transfer protocol secure (Hyper Text Transfer Protocol Secure, HTTPS) connection to the remote server based on a pre-obtained address of the remote server.

S203. The LPA sends the eUICC authentication message to the remote server, and the remote server receives the eUICC authentication message.

In some feasible implementations, the LPA may add the eUICC authentication message to a first command, and send the first command to the remote server. The first command may be a start authentication (for example, InitiateAuthentication) command sent by the LPA to the remote server. The first command may further carry information such as the eUICC random number and the pre-obtained address of the remote server.

S204. The remote server determines target verification information based on the eUICC authentication message.

In some feasible implementations, before the remote server determines the target verification information based on the eUICC authentication message, the method further includes: the remote server checks the address of the remote server and the eUICC authentication message in the first command.

In this embodiment of this application, the target verification information may include a target public key identifier for signing and a target verification certificate. The remote server may determine, based on the public key identifier list for signing in the eUICC authentication message, the target public key identifier for signing, and determine the target verification certificate based on the public key identifier list for verification in the eUICC authentication message. There may be one or more target public key identifiers for signing, and there may also be one or more target verification certificates.

Further, when a same public key identifier for signing exists in the public key identifier list for signing and a local certificate issuer (Certificate Issuer, CI) public key identifier list, the remote server may determine the public key identifier for signing that exists in both the two lists, as a target public key identifier for signing (for example, euiccCiPKId-ToBeUsed).

In some feasible implementations, the local CI public key identifier list may further include a local CI public key identifier set. When a plurality of same public key identifiers for signing exist in the public key identifier list for signing and the local CI public key identifier list, a CI public key identifier corresponding to a CI public key of a highest priority may be selected, based on an order of priorities of a plurality of public keys for signing that correspond to the plurality of same public key identifiers for signing, as a target public key identifier for signing.

Further, when a same public key identifier for verification exists in the public key identifier list for verification and the local certificate issuer CI public key identifier list, the remote server may determine a certificate (for example, CERT.DSauth.ECDSA) corresponding to a CI public key identifier that exists in both the two lists, as a target verification certificate.

In some feasible implementations, when a plurality of same CI public key identifiers exist in the public key identifier list for verification and the local certificate issuer public key identifier list, a CI public key identifier corresponding to a CI public key of a highest priority may be selected, based on an order of priorities of a plurality of CI public keys corresponding to the plurality of same CI public key identifiers, as a target public key identifier for verification, and a verification certificate corresponding to the target public key identifier for verification is determined as a target verification certificate.

In some feasible implementations, after the remote server determines the target verification information based on the eUICC authentication message, the method further includes: generating an authentication session identifier; generating a remote server random number (for example, a serverChallenge), where the serverChallenge includes but is not limited to an ODSChallenge, a DSChallenge, or a DPChallenge; generating authentication and verification data (for example, serverSigned), where the serverSigned includes but is not limited to DSSigned, DPSigned, or ODSSigned; and generating a signature of the authentication and verification data (for example, a serverSignature), where the serverSignature includes but is not limited to a DSSignature, a DPSignature, or an ODSSignature. Specifically, the remote server performs signature calculation on the authentication and verification data by using a private key of the target verification certificate, and generates a signature of the authentication and verification data.

S205. The remote server sends a first authentication message to the LPA, where the first authentication message includes the target verification information, and the LPA receives the first authentication message.

In this embodiment of this application, the first authentication message includes the target public key identifier for signing and the target verification certificate. The first authentication message may further include the authentication session identifier (for example, a TranscationID), the authentication and verification data, the signature of the authentication and verification data, the address of the remote server, and the like.

S206. The LPA sends the first authentication message to the eUICC, and the eUICC receives the first authentication message.

In some feasible implementations, before the LPA sends the first authentication message to the eUICC, the method may further include: the LPA checks the address of the remote server.

S207. The eUICC verifies the first authentication message.

In this embodiment of this application, the eUICC may verify the target verification certificate; use the authentication and verification data to verify the signature of the authentication and verification data; and verify the authentication and verification data.

S208. The eUICC sends a second authentication message to the LPA, and the LPA receives the second authentication message.

In some feasible implementations, before the eUICC sends the second authentication message to the LPA, the method further includes: the eUICC generates eUICC data (for example, euiccSigned); and the eUICC generates a signature of the eUICC data (for example, an euiccSignature). The second authentication message may include the eUICC data, the signature of the eUICC data, an eUICC certificate, (for example, CERT.EUICC.ECDSA), an eUICC manufacturer certificate (for example, CERT.EUM.ECDSA), and the like.

S209. The LPA sends the second authentication message to the remote server, and the remote server receives the second authentication message.

In some feasible implementations, the LPA may add the second authentication message to a second command, and send the second command to the remote server. The second command may be an authentication client (for example, AuthenticateClient) command sent by the LPA to the remote server.

S210. The remote server verifies the second authentication message based on the target verification information.

In this embodiment of this application, the remote server may verify the eUICC certificate based on the target verification information, and verify the eUICC manufacturer certificate; use the eUICC data to verify the signature of the eUICC data; and verify to-be-signed data of the eUICC, and the like.

In some feasible implementations, after the remote server successfully verifies the second authentication message, the remote server and user equipment may perform other subsequent operations, so that the remote server can continue to provide various services for the user equipment. For example, an SM-DP+ may provide a profile download service and a profile remote management service for the user equipment; an SM-DS may provide an event query service for the user equipment; and the SM-DP+ and an ODS may provide an eUICC firmware update service for the user equipment.

Figure 3:
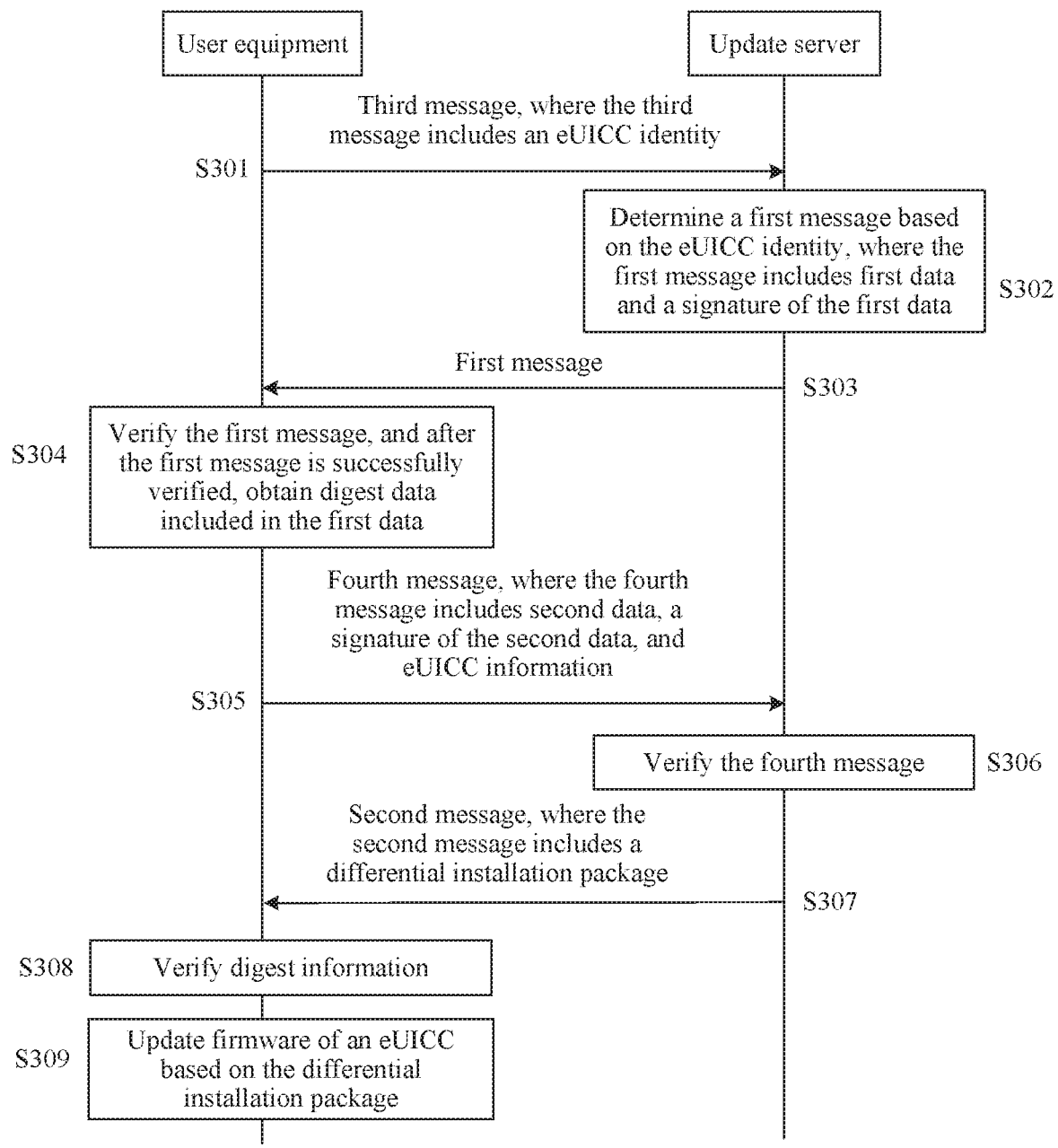
FIG. 3 is a schematic flowchart of a firmware update method according to an embodiment of this application.

FIG. 3 is a schematic flowchart of a firmware update method according to an embodiment of this application. The firmware update method described in this embodiment includes the following steps.

S301. User equipment sends a third message to an update server, where the third message includes an eUICC identity, and the update server receives the third message.

In this embodiment of this application, the update server is configured to store an EID of specified user equipment that is sent by an EUM, digest data, and a differential installation package for updating firmware of an eUICC corresponding to the EID. The update server is further configured to send, to the user equipment corresponding to the EID, the digest data stored by the update server and the differential installation package for updating the firmware of the eUICC corresponding to the EID. For example, the update server may be an ODS, or may be an SM-DP+. Specifically, the user equipment sends the third message to the update server based on a pre-obtained address of the update server, where the third message includes the eUICC identity of the user equipment, and the third message may further include current eUICC firmware information of the user equipment (for example, eUICCFirmware1), for example, current eUICC firmware version information of the user equipment.

In some feasible implementations, before the user equipment sends the third message to the update server, the method further includes: the user equipment receives a target event record and the address of the update server that are sent by an event management server based on the eUICC identity of the user equipment, where the target event record is used to instruct the user equipment to perform an operation of updating the eUICC firmware. Further, the user equipment may perform mutual authentication with the update server. For a specific implementation, refer to the foregoing descriptions. Details are not described again herein. The third message sent by the user equipment to the update server may be an eUICC authentication message sent by the user equipment to the update server in a process of performing mutual authentication by the user equipment with the update server. The user equipment may add, in the process of performing mutual authentication with the update server, the current eUICC firmware information to a first command, and send the first command to the update server. Alternatively, the user equipment may add, in the process of performing mutual authentication with the update server, the current eUICC firmware information to a second command, and send the second command to the update server. The event management server may be an SM-DS, or may be another server having an event management function such as event registration, event deletion, event sending, or event modification, or is a server that provides one or more SM-DP+ addresses or ODS addresses for the user equipment so that the user equipment establishes a communications connection to the SM-DS+ or the OPS.

S302. The update server determines a first message based on the eUICC identity included in the third message, where the first message includes first data and a signature of the first data.

In this embodiment of this application, after receiving the third message, the update server determines the first message based on the eUICC identity included in the third message. First, the update server queries, based on the eUICC identity, a software package list pre-generated by the update server, to obtain the first data (for example, serverSigned1) corresponding to the user equipment, where the first data includes digest information of a differential installation package between a first installation package and a second installation package, and the first data further includes at least one of digest information of the first installation package or digest information of the second installation package. The digest information of the first installation package is digest information of an installation package corresponding to a current eUICC firmware version of the user equipment and stored by the update server. The digest information of the second installation package is digest information of an installation package of an updated firmware version corresponding to the current eUICC firmware version of the user equipment and stored by the update server. For example, the current eUICC firmware version of the user equipment is a version 2.0, the updated firmware version may be a version 3.0, and the differential installation package between the first installation package and the second installation package is an installation package including a differential part between the installation package corresponding to the firmware version 3.0 and the installation package corresponding to the firmware version 2.0.

Then the update server performs signature calculation on the first data by using a private key of a certificate of the update server, and generates the signature of the first data (for example, a serverSignature1). The update server generates a first session identifier (for example, a TranscationID1). The first data may further include the first session identifier. The first message includes the first data and the signature of the first data, and the first message may further include the address of the update server.

In some feasible implementations, the update server may also perform signature calculation on the first data by using a private key of a target verification certificate determined in the process of performing mutual authentication with the user equipment, and generate the signature of the first data.

S303. The update server sends the first message to the user equipment, and the user equipment receives the first message.

S304. The user equipment verifies the first message, and after the first message is successfully verified, obtains the digest data included in the first data.

In this embodiment of this application, after receiving the first message, the user equipment verifies the first message. Specifically, the user equipment first decrypts the signature of the first data by using a pre-obtained public key of the certificate of the update server, to obtain decrypted first data, and calculates digest information of the first data; then the user equipment compares the decrypted first data with the digest information of the first data; and if the decrypted first data is consistent with the digest information of the first data, the user equipment determines that the first message is successfully verified. The public key of the certificate of the update server may be obtained by the user equipment in the process of performing mutual authentication with the update server.

Further, after the first message is successfully verified, the user equipment obtains the digest data included in the first data. The digest data includes the digest information of the differential installation package between the first installation package and the second installation package, and the digest information of the first installation package; or the digest data includes the digest information of the differential installation package between the first installation package and the second installation package, and the digest information of the second installation package; or the digest data includes the digest information of the differential installation package between the first installation package and the second installation package, the digest information of the first installation package, and the digest information of the second installation package.

In some feasible implementations, the digest data stored by the update server is digest data sent by the EUM to the update server after the EUM performs encryption by using a private key of the EUM (for example, SK.EUM.ECDSA). Therefore, the digest data is encrypted digest data. After the user equipment obtains the encrypted digest data included in the first data, the user equipment decrypts the encrypted digest data by using a prestored public key of the EUM (for example, PK.EUM.ECDSA), to obtain decrypted digest data.

In some feasible implementations, if the update server performs signature calculation on the first data by using the private key of the target verification certificate, and generates the signature of the first data, in a process of verifying the first message, the user equipment first decrypts the signature of the first data by using a pre-obtained public key of the target verification certificate, to obtain decrypted first data, and calculates the digest information of the first data; then the user equipment compares the decrypted first data with the digest information of the first data and if the decrypted first data is consistent with the digest information of the first data, the user equipment determines that the first message is successfully verified. The public key of the target verification certificate may be obtained by the user equipment in the process of performing mutual authentication with the update server.

S305. The user equipment sends a fourth message to the update server, where the fourth message includes second data, a signature of the second data, and eUICC information, and the update server receives the fourth message.

In this embodiment of this application, before the user equipment sends the fourth message to the update server, the method further includes: generating a second session identifier (for example, a TranscationID2) and eUICC temporary session keys, where the eUICC temporary session keys include an eUICC temporary session public key (otPK.EUICC.ECKA) and an eUICC temporary session private key (toSK.EUICC.ECKA). The fourth message includes the second data (for example, euiccSigned1), the signature of the second data (for example, an euiccSignature1), and the eUICC information (for example, euicInfo1). The second data includes the second session identifier and the eUICC temporary session public key. The user equipment performs signature calculation on the second data and the signature of the first data by using the eUICC temporary session private key, and generates the signature of the second data. The eUICC information includes the eUICC firmware information. The fourth message may further include the address of the update server, and a pre-obtained target event identifier.

S306. The update server verifies the fourth message.

In this embodiment of this application, after receiving the fourth message, the update server verifies the fourth message. Specifically, the update server first decrypts the signature of the second data by using the eUICC temporary session public key, to obtain decrypted second data, and calculates digest information of the 15 second data and the signature of the first data then the update server compares the digest information of the second data and the signature of the first data with the decrypted second data; and if the digest information of the second data and the signature of the first data is consistent with the decrypted second data, the update server determines that the fourth message is successfully verified.

Further, the update server parses the eUICC information to obtain the current eUICC firmware version information of the user equipment, and queries the pre-generated software package list based on the eUICC identity and the current eUICC firmware version information of the user equipment to obtain the differential installation package between the first installation package and the second installation package that is stored by the update server. The update server may generate a third session identifier (for example, a TranscationID3), temporary keys of the update server, and session keys of the update server (for example. Session keys). The temporary keys of the update server include a temporary public key of the update server (otPK. DSauth.ECKA) and a temporary private key of the update server (toSK. DSauth.ECKA). The session keys of the update server include a session public key of the update server and a session private key of the update server, where the session private key of the update server is used to encrypt the differential installation package between the first installation package and the second installation package.

In some feasible implementations, the fourth message includes the second data, the signature of the second data, and the eUICC information; the second data includes the second session identifier, the eUICC temporary session public key, and the signature of the first data; and the user equipment performs signature calculation on the second data by using the eUICC temporary session private key, and generates the signature of the second data. After receiving the fourth message, the update server verifies the fourth message. Specifically, the update server first decrypts the signature of the second data by using the eUICC temporary session public key included in the second data, to obtain the decrypted second data, and calculates digest information of the second data; then the update server compares the digest information of the second data with the decrypted second data; and if the digest information of the second data is consistent with the decrypted second data, the update server determines that the fourth message is successfully verified. Further, the signature of the first data included in the second data may be compared with the signature of the first data generated by the update server, and an identity of the user equipment is further determined.

S307. The update server sends a second message to the user equipment, where the second message includes the differential installation package, and the user equipment receives the second message.

In this embodiment of this application, the second message includes the differential installation package between the first installation package and the second installation package, where the differential installation package may be a differential installation package encrypted by the update server by using the session private key of the update server; and the second message may further include third data, and a signature of the third data, where the third data includes the third session identifier, the session public key of the update server, and the temporary public key of the update server. Before the update server sends the second message to the user equipment, the method further includes: the update server performs signature calculation on the third data by using the temporary private key of the update server, and generates the signature of the third data. The second message may further include the eUICC information, the eUICC firmware information, and the like.

In some feasible implementations, after receiving the second message, the user equipment verifies the second message. Specifically, the user equipment first decrypts the signature of the third data by using the temporary public key of the update server that is included in the third data, to obtain decrypted third data, and calculates digest information of the third data; then the user equipment compares the digest information of the third data with the decrypted third data; and if the digest information of the third data is consistent with the decrypted third data, the user equipment determines that the second message is successfully verified. Further, the user equipment may decrypt the encrypted differential installation package by using the session public key of the update server that is included in the third data, to obtain the first differential installation package.

In some feasible implementations, the differential installation package between the first installation package and the second installation package that is stored by the update server is a differential installation package sent by the EUM to the update server after the EUM performs encryption by using the private key of the EUM. Therefore, the first differential installation package obtained by the user equipment is the encrypted differential installation package. After obtaining the first differential installation package, the user equipment decrypts the first differential installation package by using the prestored public key of the EUM, to obtain the decrypted differential installation package.

S308. The user equipment verifies the digest data.

In this embodiment of this application, if the digest data includes the digest information (referred to as first digest information hereinafter) of the differential installation package between the first installation package and the second installation package and includes the digest information of the first installation package, that the user equipment verifies the digest data includes: verifying the digest information of the first installation package, and specifically, obtaining digest information of an installation package (referred to as a third installation package hereinafter) locally stored by the user equipment and corresponding to the current firmware version of the user equipment, comparing the digest information of the third installation package with the digest information of the first installation package; and if the digest information of the third installation package is the same as the digest information of the first installation package, determining that the digest information of the first installation package is successfully verified. Therefore, it indicates that the installation package stored by the EUM and corresponding to the current eUICC firmware version of the user equipment, that is, the first installation package, is not tampered. Therefore, validity and eligibility of the differential installation package included in the obtained second message can be ensured.

Further, the first digest information is verified. Specifically, the user equipment obtains digest information of the differential installation package included in the second message, compares the first digest information with the digest information of the differential installation package included in the second message, and if the first digest information is the same as the digest information of the differential installation package included in the second message, determines that the first digest information is successfully verified. Therefore, it indicates that the differential installation package included in the second message is not tampered. Therefore, integrity of the differential installation package included in the second message can be ensured. When both the first digest information and the digest information of the first installation package are successfully verified, it is determined that the digest information is successfully verified.

In this embodiment of this application, if the digest data includes the first digest information and the digest information of the second installation package, that the user equipment verifies the digest data includes: verifying the first digest information. Specifically, the user equipment obtains the digest information of the differential installation package included in the second message, compares the first digest information with the digest information of the differential installation package included in the second message, and if the first digest information is the same as the digest information of the differential installation package included in the second message, determines that the first digest information is successfully verified, thereby determining that the differential installation package included in the second message is not tampered.

Further, the digest information of the second installation package is verified. Specifically, the user equipment obtains the third installation package and the digest information of the third installation package, combines the third installation package with the differential installation package included in the second message, obtains a fourth installation package, obtains digest information of the fourth installation package, then compares the digest information of the fourth installation package with the digest information of the second installation package, and if the digest information of the fourth installation package is the same as the digest information of the second installation package, determines that the digest information of the second installation package is successfully verified, thereby determining that the installation package stored by the EUM and corresponding to the updated firmware version of the user equipment, that is, the second installation package, is not tampered. Because the installation package obtained through combination by using the differential installation package included in the second message and the third installation package is consistent with the second installation package, it may further indicate validity and eligibility of the differential installation package included in the second message. When both the first digest information and the digest information of the second installation package are successfully verified, it is determined that the digest information is successfully verified.

In this embodiment of this application, if the digest data includes the first digest information, the digest information of the first installation package, and the digest information of the second installation package, that the user equipment verifies the digest data includes: verifying the digest information of the first installation package, verifying the first digest information, and verifying the digest information of the second installation package. For a specific verification process, refer to the foregoing descriptions. Details are not described again herein. When the first digest information, the digest information of the first installation package, and the digest information of the second installation package are all successfully verified, it is determined that the digest information is successfully verified. In the foregoing manner, before the eUICC firmware is upgraded by using the differential installation package included in the second message, the user equipment may determine whether the installation package stored by the EUM and corresponding to the current eUICC firmware version of the user equipment and the installation package stored by the EUM and corresponding to the updated firmware version of the user equipment are tampered, determine whether the differential installation package included in the second message obtained by the user equipment is tampered, and determine whether the installation package obtained through combination by using the differential installation package included in the second message and the third installation package is consistent with the installation package of the updated firmware version stored by the EUM. Therefore, when the eUICC firmware is updated by using the differential installation package included in the second message, eligibility and integrity of the differential installation package included in the second message are verified. Therefore, security of the firmware update is ensured.

S309. The user equipment updates the firmware of the eUICC based on the differential installation package.

In some feasible implementations, after the user equipment updates the firmware of the eUICC based on the differential installation package included in the second message, the user equipment obtains and stores the installation package corresponding to the updated firmware version of the eUICC and digest information of the installation package. Therefore, when the user equipment updates the firmware of the eUICC next time, the user equipment directly reads the installation package corresponding to the eUICC firmware version updated last time and the digest information of the installation package that are stored, where the installation package corresponding to the eUICC firmware version updated last time and the digest information of the installation package that are read are the installation package of the current firmware version of the user equipment and the digest information of the installation package in this firmware update process of the user equipment.

In some feasible implementations, the EUM may further send, to the update server, the installation package stored by the EUM and corresponding to the current firmware version of the user equipment, that is, the first installation package, and the installation package stored by the EUM and corresponding to the updated firmware version, that is, the second installation package, and the update server receives and stores the first installation package and the second installation package.

To describe the technical solutions in the embodiments of this application more clearly, the following uses an LPA and an eUICC of user equipment as independent execution bodies to describe a specific implementation process of a method for updating firmware by the user equipment. It should be understood that, after interaction steps between the LPA and the eUICC (that is, an internal interaction process of the user equipment) are omitted, operation steps performed by the LPA and the eUICC are operation steps performed by the user equipment. The following uses an SM-DS representing an event management server and an ODS representing an update server to describe in detail a firmware update method in an embodiment of this application.

Figure 4A:
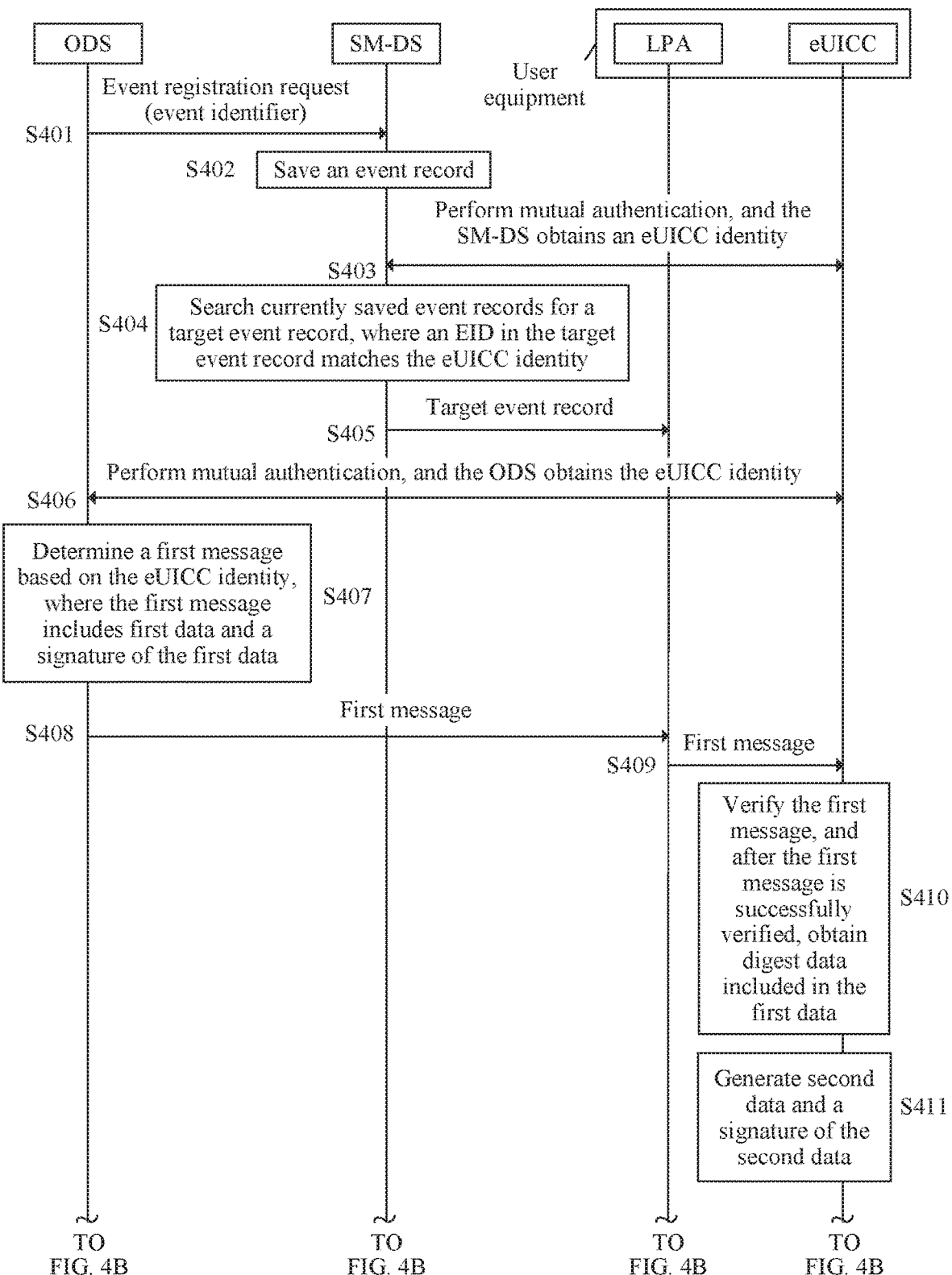
FIG. 4A and FIG. 4B are a schematic flowchart of another firmware update method according to an embodiment of this application.
Figure 4B:
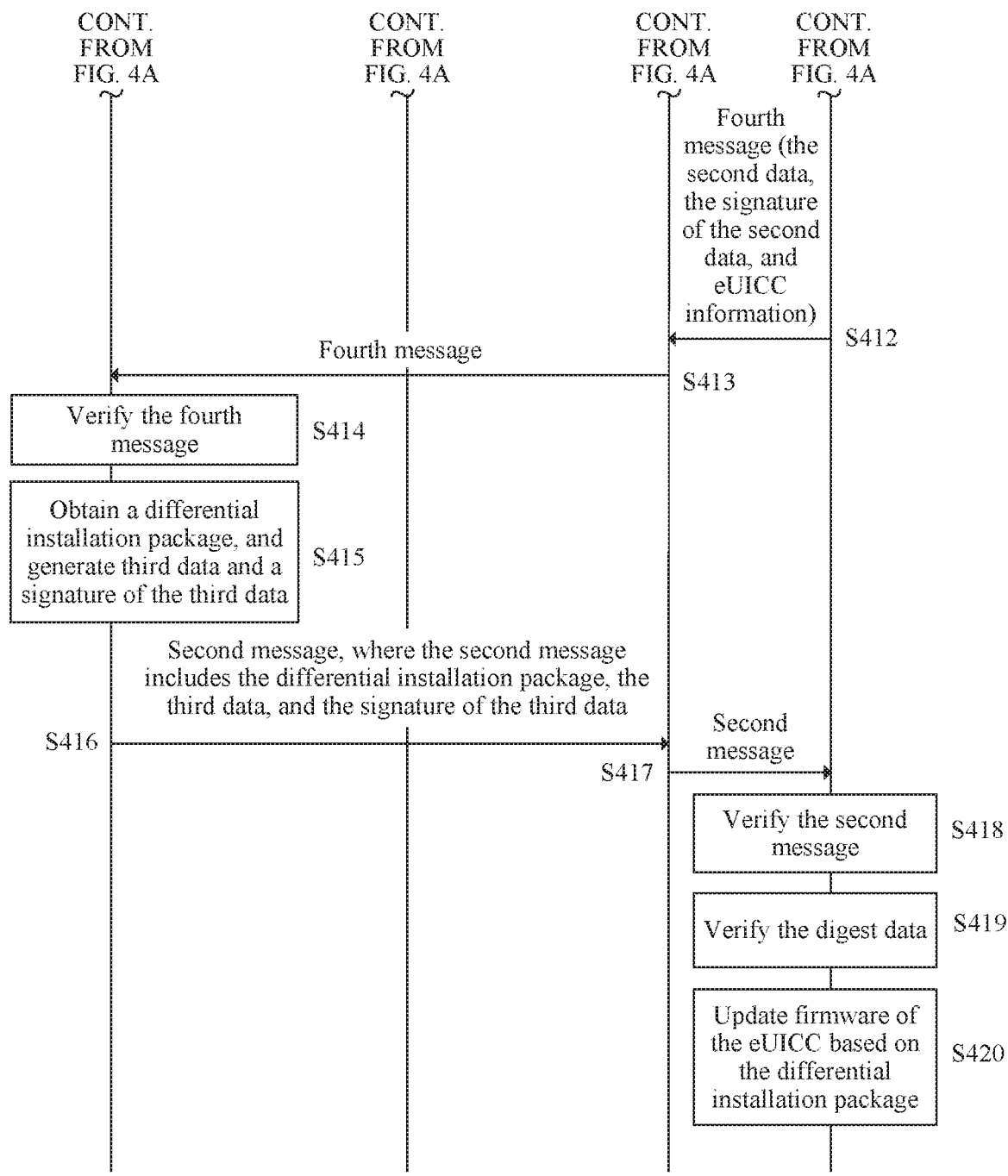

FIG. 4A and FIG. 4B are a schematic flowchart of another firmware update method according to an embodiment of this application. The firmware update method described in this embodiment includes the following steps.

S401. An ODS sends an event registration request (for example, RegisterEvent) to an SM-DS, where the event registration request carries an event identifier, and the SM-DS receives the event registration request.

In this embodiment of this application, the event identifier is an update event identifier. Before the ODS sends the event registration request to the SM-DS, the method further includes: the ODS receives and saves an EID of a specified eUICC, digest data, and a differential installation package between a first installation package and a second installation package that are sent by an EUM, where the differential installation package is used to update firmware of the eUICC corresponding to the EID; the ODS records a correspondence between the EID, the digest data, and the differential installation package into a software package list; and the ODS server generates the update event identifier, and sends the event registration request to the SM-DS. The update event identifier is associated with a firmware update event of the eUICC corresponding to the EID, and the event registration request may further carry an ODS address, the EID, and the like.

In some feasible implementations, before the ODS sends the event registration request to the SM-DS, the ODS may further perform mutual authentication with the SM-DS. For a specific implementation process, refer to the foregoing descriptions. Details are not described again herein.

S402. The SM-DS saves an event record.

In this embodiment of this application, the SM-DS saves the update event identifier in the event registration request to the event record. The SM-DS may further save a correspondence between the ODS address, the EID, and the update event identifier to the event record.

S403. The eUICC performs mutual authentication with the SM-DS, and the SM-DS obtains the eUICC identity.

In this embodiment of this application, the eUICC is the eUICC corresponding to the specified EID. For a specific implementation process of performing mutual authentication by the eUICC with the SM-DS, refer to the foregoing descriptions. Details are not described again herein. In the process of performing mutual authentication by the eUICC with the SM-DS, the eUICC adds the eUICC identity to an eUICC authentication message, and sends the eUICC authentication message to the SM-DS.

S404. The SM-DS searches currently saved event records for a target event record, where an EID in the target event record matches the eUICC identity.

In this embodiment of this application, before the SM-DS searches the currently saved event records for the target event record, the SM-DS searches at least one pre-generated event record based on the eUICC identity, obtains a registered target event identifier (for example, an EventID) corresponding to the eUICC identity, that is, an update event identifier corresponding to the EID, and obtains an ODS address (for example, an ODSaddress) corresponding to the EventID. The SM-DS sends the ODS address and the EventID to an LPA. After the LPA receives the ODS address and the EventID that are sent by the SM-DS, the SM-DS invokes a RegisterRetrieval command to search the SM-DS for a target event record corresponding to the EventID. The SM-DS searches the currently saved event records for the target event record in response to the RegisterRetrieval command, where the EID in the target event record matches the eUICC identity, and the event identifier in the target event record matches the EventID.

S405. The SM-DS sends the target event record to the LPA, and the LPA receives the target event record.

In this embodiment of this application, an event recorded in the target event record (for example, an event record) is an eUICC firmware update event, used to instruct the eUICC corresponding to the eUICC identity to perform a firmware update operation. After receiving the target event record, the LPA processes the target event record, and starts to update eUICC firmware with the eUICC.

S406. The eUICC performs mutual authentication with the ODS, and the ODS obtains the eUICC identity.

In this embodiment of this application, for a specific implementation process of performing mutual authentication by the eUICC with the ODS, refer to the foregoing descriptions. Details are not described again herein. In the process of performing mutual authentication by the eUICC with the ODS, the eUICC adds the eUICC identity to an eUICC authentication message, and sends the eUICC authentication message to the ODS. The eUICC may add, in the process of performing mutual authentication with an update server, current eUICC firmware information to a first command, and send the first command to the ODS. Alternatively, the eUICC may add, in the process of performing mutual authentication with the ODS, current eUICC firmware information to a second command, and send the second command to the ODS. It should be noted that, the third message in the foregoing method embodiment may be an authentication message sent by the eUICC to the ODS in the process of performing mutual authentication by the eUICC with the ODS.

In some feasible implementations, after mutual authentication between the eUICC and the ODS is completed, the ODS may further invoke a HandleDownloadOSProgressInfo command to report an update status of the eUICC firmware to an MNO.

S407. The ODS determines a first message based on the eUICC identity, where the first message includes first data and a signature of the first data.

In this embodiment of this application, the first data includes digest information of the differential installation package between the first installation package and the second installation package, and the first data further includes at least one of digest information of the first installation package or digest information of the second installation package. For a specific implementation of determining the first message by the ODS based on the eUICC identity, refer to related descriptions in step S302 in the foregoing method embodiment. Details are not described again herein.

S408. The ODS sends the first message to the LPA, and the LPA receives the first message.

S409. The LPA sends the first message to the eUICC, and user equipment receives the first message.

S410. The eUICC verifies the first message, and after the first message is successfully verified, obtains digest data included in the first data.

In this embodiment of this application, for a specific implementation of verifying the first message by the eUICC, refer to the related descriptions in step S304 in the foregoing method embodiment. Details are not described again herein.

In some feasible implementations, the first message sent by the LPA to the eUICC may further include a certificate (for example, CERT.ODS.ECDSA) of the ODS server, and the eUICC may further verify the certificate of the ODS server. Specifically, the eUICC verifies the certificate of the ODS server by using a target verification certificate obtained in the process of performing mutual authentication with the ODS server.

S411. The eUICC generates second data and a signature of the second data.

In this embodiment of this application, the eUICC generates a second session identifier and eUICC temporary session keys, where the eUICC temporary session keys include an eUICC temporary session public key and an eUICC temporary session private key. The second data includes the second session identifier and the eUICC temporary session public key. The user equipment performs signature calculation on the second data and the signature of the first data by using the eUICC temporary session private key, and generates the signature of the second data.

S412. The eUICC sends a fourth message to the LPA, where the fourth message includes the second data, the signature of the second data, and eUICC information, and the LPA receives the fourth message.

In this embodiment of this application, the eUICC information includes the eUICC firmware information. The fourth message may further include the address of the update server, and a pre-obtained target event identifier.

S413. The LPA sends the fourth message to the ODS, and the ODS receives the fourth message.

S414. The ODS verifies the fourth message.

In this embodiment of this application, for a specific implementation of verifying the fourth message by the ODS, refer to the related descriptions in step S306 in the foregoing method embodiment. Details are not described again herein.

S415. The ODS obtains the differential installation package, and generates third data and a signature of the third data.

In this embodiment of this application, after the fourth message is successfully verified, the ODS parses the eUICC information to obtain current eUICC firmware version information of the user equipment, and queries the pre-generated software package list based on the eUICC identity and the current eUICC firmware version information of the user equipment to obtain the differential installation package between the first installation package and the second installation package that is stored by the ODS. The ODS generates a third session identifier, temporary keys of the ODS, and session keys of the ODS. The temporary keys of the ODS include a temporary public key of the ODS and a temporary session private key of the ODS. The session keys of the ODS include a session public key of the ODS and a session private key of the ODS, where the session private key of the ODS is used to encrypt the differential installation package between the first installation package and the second installation package. The third data includes the third session identifier, the session public key of the update server, and the temporary public key of the update server. The update server performs signature calculation on the third data by using the temporary private key of the update server, and generates the signature of the third data. The second message may further include the eUICC information, the eUICC firmware information, and the like.

S416. The ODS sends a second message to the LPA, where the second message includes the differential installation package, the third data, and the signature of the third data, and the LPA receives the second message.

S417. The LPA sends the second message to the eUICC, and the eUICC receives the second message.

S418. The eUICC verifies the second message.

In this embodiment of this application, the eUICC first decrypts the signature of the third data by using the temporary public key of the update server that is included in the third data, to obtain decrypted third data, and calculates digest information of the third data; then the eUICC compares the digest information of the third data with the decrypted third data; and if the digest information of the third data is consistent with the decrypted third data, the eUICC determines that the second message is successfully verified. Further, the user equipment may decrypt the encrypted differential installation package by using the session public key of the update server that is included in the third data, to obtain the decrypted differential installation package.

S419. The eUICC verifies the digest data.

In this embodiment of this application, for a specific implementation of verifying the digest data by the eUICC, refer to the related descriptions in step S308 in the foregoing method embodiment. Details are not described again herein.

S420. The eUICC updates the firmware of the eUICC based on the differential installation package.

In some feasible implementations, after the eUICC updates the firmware of the eUICC based on the differential installation package, the eUICC obtains and stores an installation package corresponding to an updated firmware version of the eUICC and digest information of the installation package.

In some feasible implementations, after the eUICC updates the firmware of the eUICC, the method further includes: the eUICC sends a firmware update success message to the LPA, and the LPA sends the update success message to the ODS server. The update success message may be carried in an application protocol data unit (APDU). The update success message may include a current eUICC firmware upgrade result and the eUICC identity. The eUICC firmware upgrade result may further include updated firmware version information of the eUICC firmware. The ODS server searches for EventID information corresponding to the identity of the eUICC whose firmware is successfully updated, invokes a DeleteEvent interface, and reports the EID and EventID information corresponding to the eUICC identity to the SM-DS server. The SM-DS server obtains the EID and EventID information reported by the ODS, and deletes a corresponding event record. The LPA starts a profile, sends a REFRESH request to the eUICC, and registers with a network side again.

In some feasible implementations, the EUM may further send, to the ODS, an installation package stored by the EUM and corresponding to a current firmware version of the user equipment, that is, the first installation package, and the installation package stored by the EUM and corresponding to the updated firmware version, that is, the second installation package, and the ODS receives and stores the first installation package and the second installation package.

It should be noted that, for content not mentioned in the method embodiment corresponding to FIG. 4A and FIG. 4B and a specific implementation of each step, reference may be made to the related descriptions in the method embodiment corresponding to FIG. 3. Details are not described again herein.

In an embodiment of this application, a firmware update method may be further implemented through remote eUICC management. The following uses an SM-DS representing an event management server and an SM-DP+ representing an update server to describe in detail the firmware update method in an embodiment of this application.

Figure 5A:
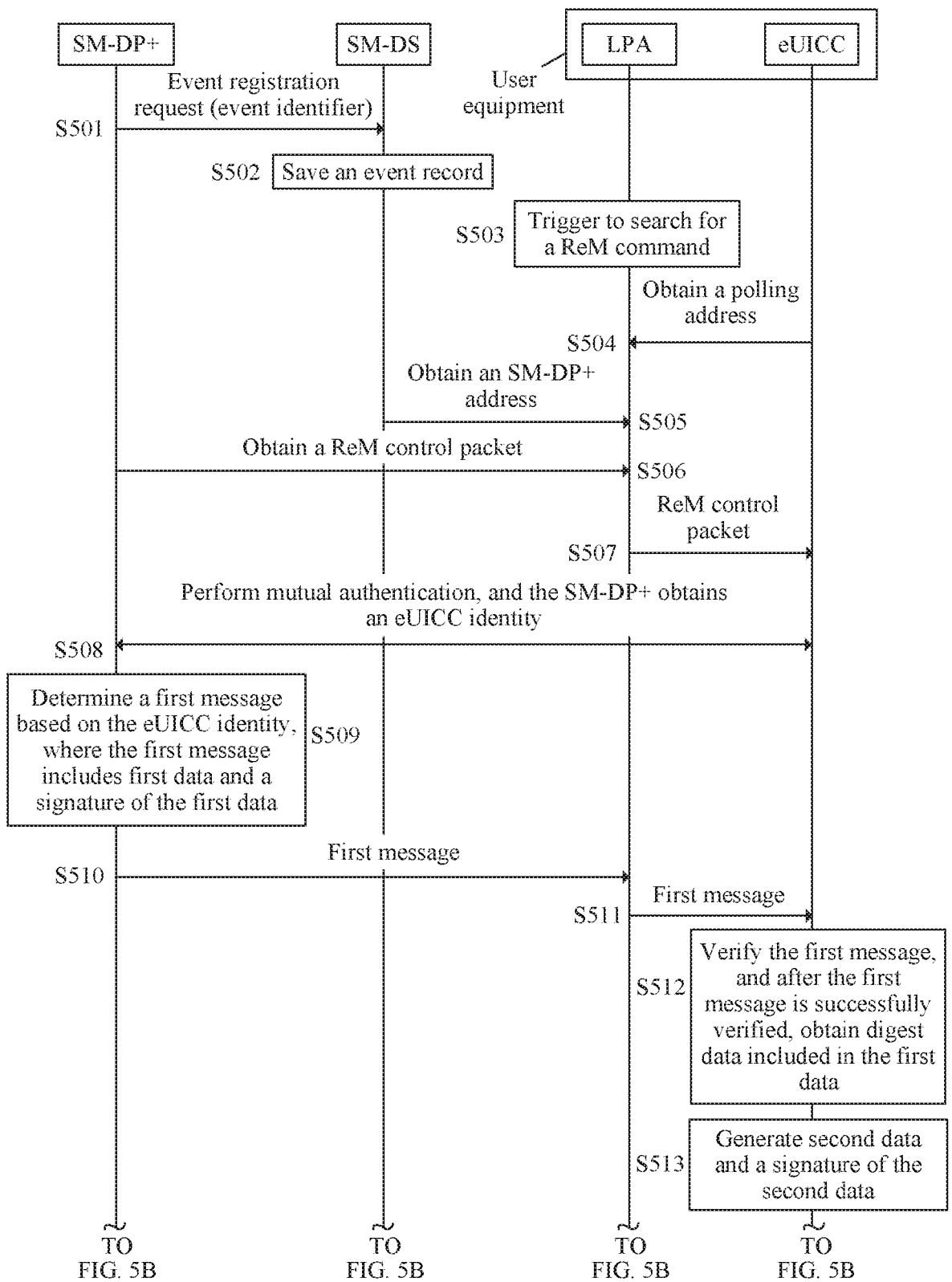
FIG. 5A and FIG. 5B are a schematic flowchart of still another firmware update method according to an embodiment of this application.
Figure 5B:
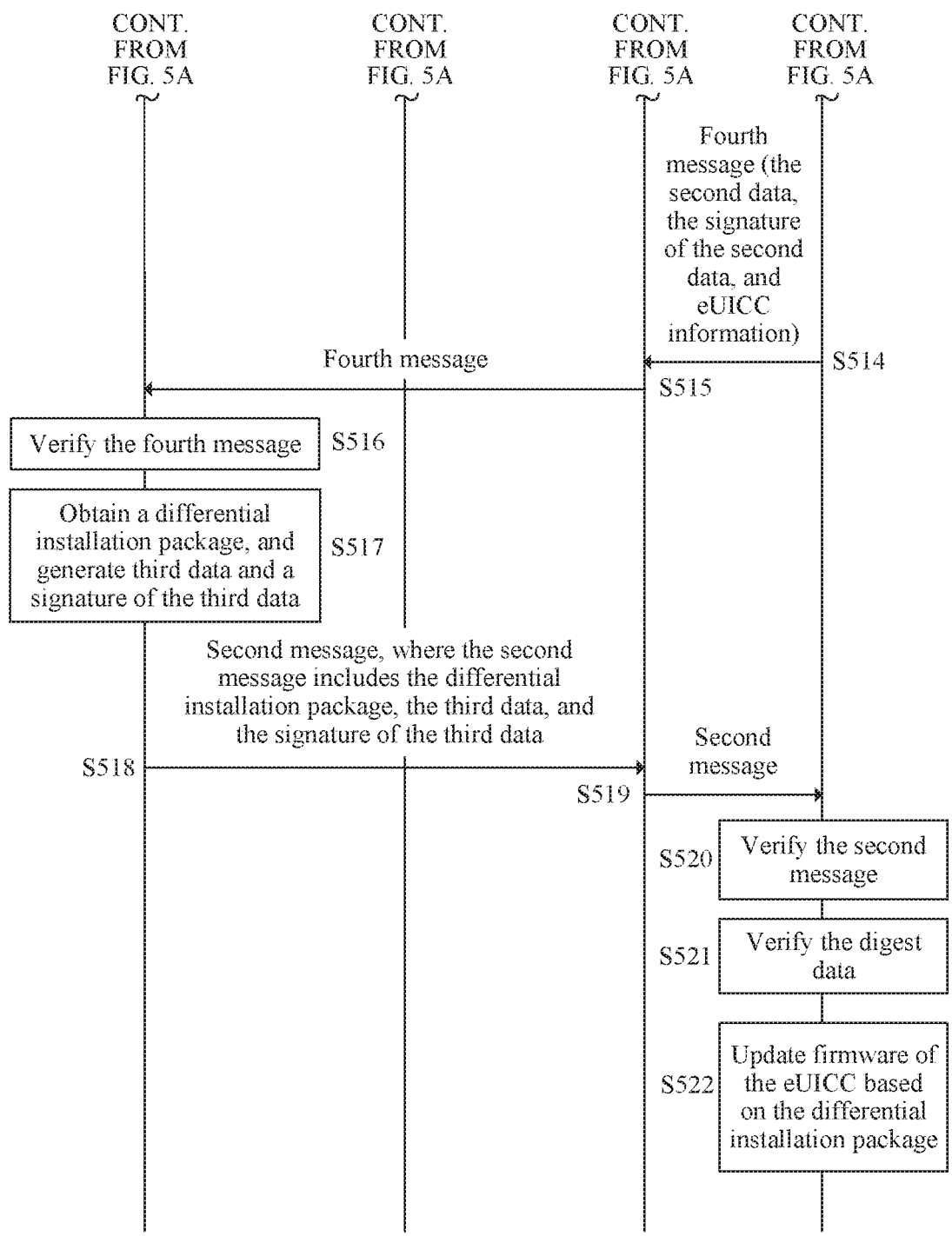

FIG. 5A and FIG. 5B are a schematic flowchart of still another firmware update method according to an embodiment of this application. The firmware update method described in this embodiment includes but is not limited to the following steps.

S501 An SM-DP+ sends an event registration request to an SM-DS, where the event registration request carries an event identifier, and the SM-DS receives the event registration request.

In this embodiment of this application, the event identifier is an update event identifier. Before the SM-DP+ sends the event registration request to the SM-DS, the method further includes: the SM-DP+ receives and saves an EID of a specified eUICC, digest data, and a differential installation package between a first installation package and a second installation package that are sent by an EUM, where the differential installation package is used to update firmware of the eUICC corresponding to the EID; and the SM-DP+ records a correspondence between the EID, the digest data, and the differential installation package into a software package list. After receiving a ReM command sent by an MNO, the SM-DP+ generates the event identifier, and sends the event registration request to the SM-DS. The update event identifier is associated with a firmware update event of the eUICC corresponding to the EID, and the event registration request may further carry an SM-DP+ address, the EID, and the like.

In some feasible implementations, before the SM-DP+ sends the event registration request to the SM-DS, the SM-DP+ may further perform mutual authentication with the SM-DS. For a specific implementation process, refer to the foregoing descriptions. Details are not described again herein.

S502. The SM-DS saves an event record.

In this embodiment of this application, the SM-DS saves the update event identifier in the event registration request to the event record. The SM-DS may further save a correspondence between the SM-DP+ address, the EID, the ReM command, and the update event identifier to the event record.

S503. Trigger an LPA to search for a ReM command.

In this embodiment of this application, the LPA may be triggered by a user or automatically triggered to search for the ReM command, where the ReM command is an eUICC firmware update command.

S504. The LPA obtains a polling address from the eUICC, the eUICC sends the polling address to the LPA, and the LPA receives the polling address.

S505. The LPA obtains the SM-DP+ address from the SM-DS based on the polling address, the SM-DS sends the SM-DP+ address to the LPA, and the LPA receives the SM-DP+ address.

S506. The LPA obtains a ReM control packet from the SM-DP+ based on the SM-DP+ address, the SM-DP+ sends the ReM control packet to the LPA, and the LPA receives the ReM control packet.

S507. The LPA sends the ReM control packet to the eUICC, and the eUICC receives the ReM control packet.

In this embodiment of this application, the ReM control packet is used to control the eUICC to perform a firmware update. After receiving an agree-to-send instruction input by the user, the LPA sends the ReM control packet to the eUICC. After receiving the ReM control packet sent by the LPA, the eUICC parses and verifies the ReM control packet. After the ReM control packet is successfully verified, the eUICC sends an instruction to the LPA, asking the user for update confirmation. After receiving a confirm instruction input by the user, the LPA starts to update the eUICC firmware with the eUICC.

S508. The eUICC performs mutual authentication with the SM-DP+, and the SM-DP+ obtains the eUICC identity.

In this embodiment of this application, for a specific implementation process of performing mutual authentication by the eUICC with the SM-DP+, refer to the foregoing descriptions. Details are not described again herein. In the process of performing mutual authentication by the eUICC with the SM-DP+, the eUICC adds the eUICC identity to an eUICC authentication message, and sends the eUICC authentication message to the SM-DP+. Alternatively, the eUICC identity may be sent by the LPA to the SM-DS when the LPA obtains the ReM control packet from the SM-DP+ based on the SM-DP+ address. The eUICC may add, in the process of performing mutual authentication with an update server, current eUICC firmware information to a first command, and send the first command to the SM-DP+. Alternatively, the eUICC may add, in the process of performing mutual authentication with the SM-DP+, current eUICC firmware information to a second command, and send the second command to the SM-DP+. It should be noted that, the third message in the foregoing method embodiment may be an authentication message sent by the eUICC to the ODS in the process of performing mutual authentication by the eUICC with the SM-DP+.

In some feasible implementations, after mutual authentication between the eUICC and the SM-DP+ is completed, the ODS may further invoke a HandleDownloadOSProgressInfo command to report an update status of the eUICC to the MNO.

S509. The SM-DP+ determines a first message based on the eUICC identity, where the first message includes first data and a signature of the first data.

In this embodiment of this application, the first data includes digest information of the differential installation package between the first installation package and the second installation package, and the first data further includes at least one of digest information of the first installation package or digest information of the second installation package. For a specific implementation of determining the first message by the SM-DP+ based on the eUICC identity, refer to related descriptions in step S302 in the foregoing method embodiment. Details are not described again herein.

S510. The SM-DP+ sends the first message to the LPA, and the LPA receives the first message.

S511. The LPA sends the first message to the eUICC, and user equipment receives the first message.

S512. The eUICC verifies the first message, and after the first message is successfully verified, obtains digest data included in the first data.

In this embodiment of this application, for a specific implementation of verifying the first message by the eUICC, refer to the related descriptions in step S304 in the foregoing method embodiment. Details are not described again herein.

In some feasible implementations, the first message sent by the LPA to the eUICC may further include a certificate (for example, CERT.SM-DP+.ECDSA) of the SM-DP+ server, and the eUICC may further verify the certificate of the SM-DP+ server. Specifically, the eUICC may verify the certificate of the SM-DP+ server by using a target verification certificate obtained in the process of performing mutual authentication with the SM-DP+ server.

S513. The eUICC generates second data and a signature of the second data.

In this embodiment of this application, the eUICC generates a second session identifier and eUICC temporary session keys, where the eUICC temporary session keys include an eUICC temporary session public key and an eUICC temporary session private key. The second data includes the second session identifier and the eUICC temporary session public key. The user equipment performs signature calculation on the second data and the signature of the first data by using the eUICC temporary session private key, and generates the signature of the second data.

S514. The eUICC sends a fourth message to the LPA, where the fourth message includes the second data, the signature of the second data, and eUICC information, and the LPA receives the fourth message.

In this embodiment of this application, the eUICC information includes the eUICC firmware information. The fourth message may further include the address of the update server, and a pre-obtained target event identifier.

S515. The LPA sends the fourth message to the SM-DP+, and the SM-DP+ receives the fourth message.

S516. The SM-DP+ verifies the fourth message.

In this embodiment of this application, for a specific implementation of verifying the fourth message by the SM-DP+, refer to the related descriptions in step S306 in the foregoing method embodiment. Details are not described again herein.

S517. The SM-DP+ obtains the differential installation package, and generates third data and a signature of the third data.

In this embodiment of this application, for a specific implementation of obtaining the differential installation package and generating the third data and the signature of the third data by the SM-DP+, refer to the related descriptions in step S415 in the foregoing method embodiment. Details are not described again herein.

S518. The SM-DP+ sends a second message to the LPA, where the second message includes the differential installation package, the third data, and the signature of the third data, and the LPA receives the second message.

S519. The LPA sends the second message to the eUICC, and the eUICC receives the second message.

S520. The eUICC verifies the second message.

In this embodiment of this application, for a specific implementation of verifying the second message by the eUICC, refer to the related descriptions in step S418 in the foregoing method embodiment. Details are not described again herein.

S521. The eUICC verifies the digest data.

In this embodiment of this application, for a specific implementation of verifying the digest data by the eUICC, refer to the related descriptions in step S308 in the foregoing method embodiment. Details are not described again herein.

S522. The eUICC updates the firmware of the eUICC based on the differential installation package.

In some feasible implementations, after the eUICC updates the firmware of the eUICC based on the differential installation package, the eUICC obtains and stores an installation package corresponding to an updated firmware version of the eUICC and digest information of the installation package.

In some feasible implementations, after the eUICC updates the firmware of the eUICC, the method further includes: the eUICC sends a firmware update success message to the LPA, and then the LPA sends the update success message to the SM-DP+ server. The update success message may be carried in an application protocol data unit. The update success message may include a current eUICC firmware upgrade result and the eUICC identity. The eUICC firmware upgrade result may further include updated firmware version information of the eUICC firmware. The SM-DP+ server searches for EventID information corresponding to the identity of the eUICC whose firmware is successfully updated, invokes a DeleteEvent interface, and reports the EID and EventID information corresponding to the eUICC identity to the SM-DS server. The SM-DS server obtains the EID and EventID information reported by the SM-DP+, and deletes a corresponding event record. The LPA starts a profile, sends a REFRESH request to the eUICC, and registers with a network side again.

In some feasible implementations, the EUM may further send, to the SM-DP+, an installation package stored by the EUM and corresponding to a current firmware version of the user equipment, that is, the first installation package, and the installation package stored by the EUM and corresponding to the updated firmware version, that is, the second installation package, and the SM-DP+ receives and stores the first installation package and the second installation package.

It should be noted that, for content not mentioned in the method embodiment corresponding to FIG. 5A and FIG. 5B and a specific implementation of each step, reference may be made to the related descriptions in the method embodiment corresponding to FIG. 3 or FIG. 4A and FIG. 4B. Details are not described again herein.

The foregoing describes in detail the methods in the embodiments of this application. The following provides apparatuses in the embodiments of this application.

Figure 6:
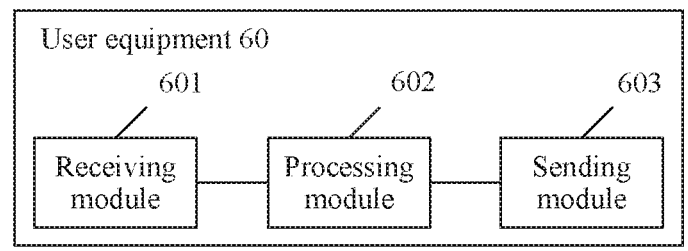
FIG. 6 is a schematic structural diagram of user equipment according to an embodiment of this application.

FIG. 6 is a schematic structural diagram of user equipment according to an embodiment of this application. Modules of the user equipment 60 shown in FIG. 6 may implement the solution of this application by using hardware, software, or a combination of hardware and software. A person skilled in the art should understand that, the modules described in FIG. 6 may be combined or divided into several submodules to implement the solution of this application. Therefore, the content described in this application above may support any possible combination, division, or further definition of the following modules.

As shown in FIG. 6, the user equipment 60 may include a receiving module 601, a processing module 602, and a sending module 603.

The receiving module 601 is configured to receive a first message sent by an update server, where the first message includes first data and a signature of the first data.

The processing module 602 is configured to verify the first message, and after the first message is successfully verified, obtain digest data included in the first data, where the digest data includes digest information of a differential installation package between a first installation package and a second installation package, and the digest data further includes at least one of digest information of the first installation package or digest information of the second installation package.

The receiving module 601 is further configured to receive a second message sent by the update server, where the second message includes the differential installation package.

The processing module 602 is further configured to verify the digest data, and after the digest data is successfully verified, update firmware of an eUICC based on the differential installation package.

The first installation package is an installation package corresponding to a current firmware version of the user equipment 60, and the second installation package is an installation package corresponding to an updated firmware version.

It should be noted that, for content not mentioned in the embodiment corresponding to FIG. 6 and a specific implementation of each module, reference may be made to the related descriptions in the method embodiment corresponding to FIG. 3, FIG. 4A and FIG. 4B, or FIG. 5A and FIG. 5B. Details are not described again herein.

Figure 7:
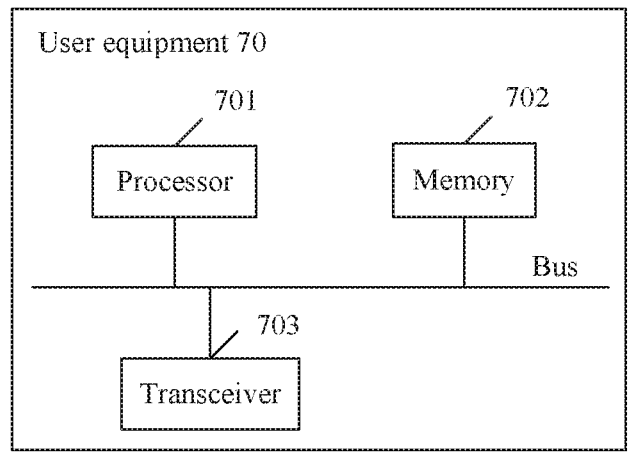
FIG. 7 is a schematic structural diagram of another user equipment according to an embodiment of this application.

In some feasible implementations, the processing module 602 may be a processor or a processing chip, the sending module 603 and the receiving module 601 may be a transceiver, and the user equipment may further include a memory. FIG. 7 is a schematic structural diagram of another user equipment according to an embodiment of this application. As shown in FIG. 7, the user equipment 70 includes a processor 701, a memory 702, and a transceiver 703, where the processor 701, the memory 702, and the transceiver 703 are connected by one or more communications buses.

The processor 701 is configured to support the user equipment in performing corresponding functions in the firmware update method shown in FIG. 3, FIG. 4A and FIG. 4B, or FIG. 5A and FIG. 5B. The processor 701 may be a central processing unit (central processing unit, CPU), a network processor (network processor, NP), a hardware chip, or any combination thereof. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 702 is configured to store program code and the like. The memory 702 may include a volatile memory (volatile memory), for example, a random access memory (random access memory, RAM). The memory 702 may also include a non-volatile memory (non-volatile memory), for example, a read-only memory (read-only memory, ROM), a flash memory (flash memory), a hard disk drive (hard disk drive, HDD), or a solid-state drive (solid-state drive, SSD). The memory 702 may further include a combination of the foregoing types of memories.

The transceiver 703 is configured to receive and send data.

The processor 701 may invoke the program code stored in the memory 702 or invoke the transceiver 703 to perform the following operations:

receiving a first message sent by an update server, where the first message includes first data and a signature of the first data;

verifying the first message, and after the first message is successfully verified, obtaining digest data included in the first data, where the digest data includes digest information of a differential installation package between a first installation package and a second installation package, and the digest data further includes at least one of digest information of the first installation package or digest information of the second installation package;

receiving a second message sent by the update server, where the second message includes the differential installation package; and verifying the digest data, and after the digest data is successfully verified, updating firmware of an eUICC based on the differential installation package; where the first installation package is an installation package corresponding to a current firmware version of the user equipment 70, and the second installation package is an installation package corresponding to an updated firmware version.

It should be noted that, the processor 701, the memory 702, and the transceiver 703 may perform the operations performed by the user equipment in the method embodiment corresponding to FIG. 3, FIG. 4A and FIG. 4B, or FIG. 5A and FIG. 5B. For details, refer to the related descriptions in the method embodiment corresponding to FIG. 3, FIG. 4A and FIG. 4B, or FIG. 5A and FIG. 5B. Details are not described again herein.

An embodiment of this application further provides a computer-readable storage medium, where the computer-readable storage medium stores a computer program, the computer program includes a program instruction, and when the program instruction is executed by a computer, the computer is enabled to perform the method in the embodiment corresponding to FIG. 3, FIG. 4A and FIG. 4B, or FIG. 5A and FIG. 5B, where the computer may be a part of the user equipment mentioned above.

An embodiment of this application further provides a computer program product, where the computer program product includes a program instruction, and when the program instruction is executed by a computer, the computer is enabled to perform the method in the embodiment corresponding to FIG. 3, FIG. 4A and FIG. 4B, or FIG. 5A and FIG. 5B, where the computer program may be a part of a program stored in the memory 702 mentioned above.

Figure 8:
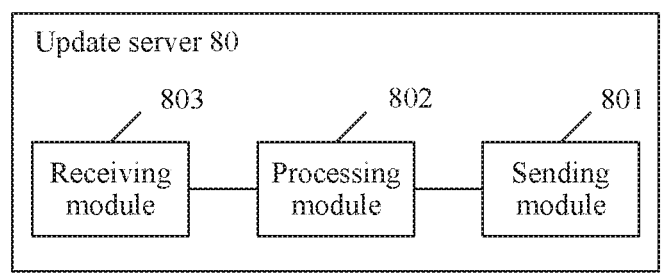
FIG. 8 is a schematic structural diagram of an update server according to an embodiment of this application.

FIG. 8 is a schematic structural diagram of an update server according to an embodiment of this application. Modules of the update server 80 shown in FIG. 8 may implement the solution of this application by using hardware, software, or a combination of hardware and software. A person skilled in the art should understand that, the modules described in FIG. 8 may be combined or divided into several submodules to implement the solution of this application. Therefore, the content described in this application above may support any possible combination, division, or further definition of the following modules.

As shown in FIG. 8, the update server 80 may include a sending module 801, a processing module 802, and a receiving module 803.

The sending module 801 is configured to send a first message to user equipment, where the first message includes first data and a signature of the first data, the first data includes digest data, the digest data includes digest information of a differential installation package between a first installation package and a second installation package, and the digest data further includes at least one of digest information of the first installation package or digest information of the second installation package.

The sending module 801 is further configured to send a second message to the user equipment, so that the user equipment updates firmware of an eUICC based on the digest data by using the differential installation package included in the second message.

The first installation package is an installation package corresponding to a current firmware version of the user equipment, and the second installation package is an installation package corresponding to an updated firmware version.

It should be noted that, for content not mentioned in the embodiment corresponding to FIG. 8 and a specific implementation of each module, reference may be made to the related descriptions in the method embodiment corresponding to FIG. 3, FIG. 4A and FIG. 4B, or FIG. 5A and FIG. 5B. Details are not described again herein.

Figure 9:
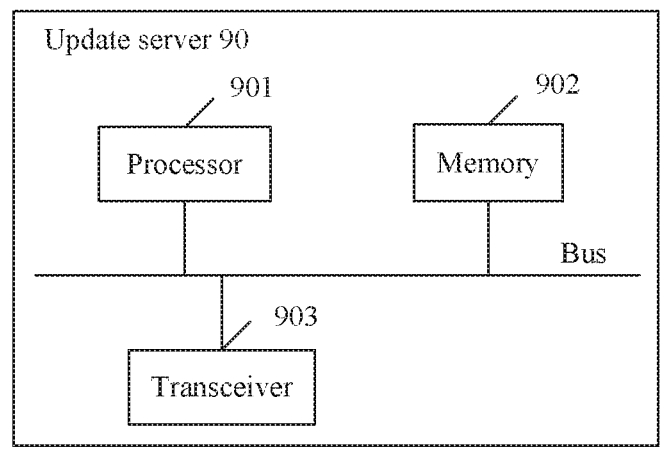
FIG. 9 is a schematic structural diagram of another update server according to an embodiment of this application.

In some feasible implementations, the processing module 802 may be a processor or a processing chip, the sending module 801 and the receiving module 803 may be a transceiver, and the update server may further include a memory. FIG. 9 is a schematic structural diagram of another update server according to an embodiment of this application. As shown in FIG. 9, the update server 90 includes a processor 901, a memory 902, and a transceiver 903, where the processor 901, the memory 902, and the transceiver 903 are connected by one or more communications buses.

The processor 901 is configured to support the update server in performing corresponding functions in the firmware update method shown in FIG. 3, FIG. 4A and FIG. 4B, or FIG. 5A and FIG. 5B. The processor 901 may be a central processing unit (central processing unit, CPU), a network processor (network processor, NP), a hardware chip, or any combination thereof. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 902 is configured to store program code and the like. The memory 902 may include a volatile memory (volatile memory), for example, a random access memory (random access memory, RAM). The memory 902 may also include a non-volatile memory (non-volatile memory), for example, a read-only memory (read-only memory, ROM), a flash memory (flash memory), a hard disk drive (hard disk drive, HDD), or a solid-state drive (solid-state drive, SSD). The memory 902 may further include a combination of the foregoing types of memories.

The transceiver 903 is configured to receive and send data.

The processor 901 may invoke the program code stored in the memory 902 or invoke the transceiver 903 to perform the following operations:

sending a first message to user equipment, where the first message includes first data and a signature of the first data, the first data includes digest data, the digest data includes digest information of a differential installation package between a first installation package and a second installation package, and the digest data further includes at least one of digest information of the first installation package or digest information of the second installation package; and sending a second message to the user equipment, so that the user equipment updates firmware of an eUICC based on the digest data by using the differential installation package included in the second message; where the first installation package is an installation package corresponding to a current firmware version of the user equipment, and the second installation package is an installation package corresponding to an updated firmware version.

It should be noted that, the processor 901, the memory 902, and the transceiver 903 may perform the operations performed by the update server in the method embodiment corresponding to FIG. 3, FIG. 4A and FIG. 4B, or FIG. 5A and FIG. 5B. For details, refer to the related descriptions in the method embodiment corresponding to FIG. 3, FIG. 4A and FIG. 4B, or FIG. 5A and FIG. 5B. Details are not described again herein.

An embodiment of this application further provides a computer-readable storage medium, where the computer-readable storage medium stores a computer program, the computer program includes a program instruction, and when the program instruction is executed by a computer, the computer is enabled to perform the method in the embodiment corresponding to FIG. 3, FIG. 4A and FIG. 4B, or FIG.

5A and FIG. 5B, where the computer may be a part of the update server mentioned above.

An embodiment of this application further provides a computer program product, where the computer program product includes a program instruction, and when the program instruction is executed by a computer, the computer is enabled to perform the method in the embodiment corresponding to FIG. 3, FIG. 4A and FIG. 4B, or FIG. 5A and FIG. 5B, where the computer program may be a part of a program stored in the memory 902 mentioned above.

Figure 10:
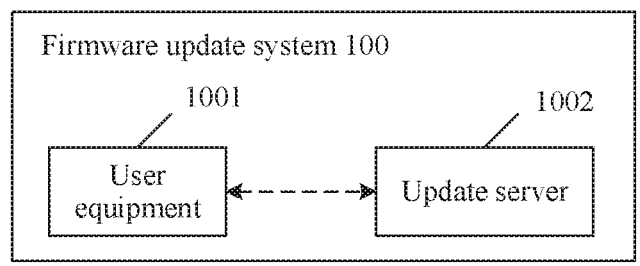
FIG. 10 is a schematic architectural diagram of a firmware update system according to an embodiment of this application.

FIG. 10 is a schematic structural diagram of a firmware update system including user equipment and an update server according to an embodiment of this application. As shown in the figure, the firmware update system 100 includes user equipment 1001 and an update server 1002. A communications connection, for example, a Wi-Fi connection or a mobile data connection, exists between the user equipment 1001 and the update server 1002, and may implement data communication between the user equipment 1001 and the update server 1002.

The update server 1002 is configured to send a first message to the user equipment 1001, where the first message includes first data and a signature of the first data, the first data includes digest data, the digest data includes digest information of a differential installation package between a first installation package and a second installation package, and the digest data further includes at least one of digest information of the first installation package or digest information of the second installation package.

The user equipment 1001 is configured to receive the first message sent by the update server 1002.

The user equipment 1001 is further configured to verify the first message, and after the first message is successfully verified, obtain the digest data included in the first data.

The update server 1002 is further configured to send a second message to the user equipment, where the second message includes the differential installation package.

The user equipment 1001 is further configured to verify the digest data, and after the digest data is successfully verified, update firmware of an eUICC based on the differential installation package.

The first installation package is an installation package corresponding to a current firmware version of the user equipment 1001, and the second installation package is an installation package corresponding to an updated firmware version.

It should be noted that, the system shown in FIG. 10 may further include a terminal such as an event management server SM-DS. For content not mentioned in the embodiment corresponding to FIG. 10 and specific implementations of the user equipment 1001 and the update server 1002, refer to the related descriptions in the method embodiment corresponding to FIG. 3, FIG. 4A and FIG. 4B, or FIG. 5A and FIG. 5B. Details are not described again herein.

Figure 11:
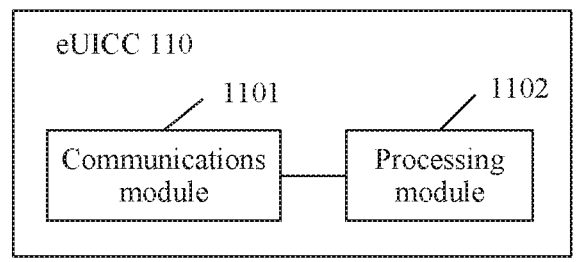
FIG. 11 is a schematic structural diagram of an eUICC according to an embodiment of this application.

In some feasible implementations, the user equipment may include an eUICC and a local profile assistant LPA. The local profile assistant LPA may exist as one or more software modules on a hardware module of the user equipment, for example, exist on a baseband chip, an application processor, or other hardware. Alternatively, the local profile assistant may directly exist on the eUICC. The local profile assistant LPA has a function of performing interaction between the eUICC and the user equipment and the update server. The eUICC is an embedded UICC, and may be embedded in the user equipment in a form of a single chip, or may be used as a part of another single chip in the user equipment. However, this does not mean that the eUICC must be embedded in the user equipment and cannot be removed. Alternatively, the eUICC may be in a form of a removable card. FIG. 11 is a schematic structural diagram of an eUICC according to an embodiment of this application. As shown in FIG. 11, the eUICC 110 may include a communications module 1101 and a processing module 1102.

The communications module 1101 is configured to receive a first message sent by an LPA, where the first message includes first data and a signature of the first data, and the first message is sent by an update server to the LPA.

The processing module 1102 is configured to verify the first message, and after the first message is successfully verified, obtain digest data included in the first data, where the digest data includes digest information of a differential installation package between a first installation package and a second installation package, and the digest data further includes at least one of digest information of the first installation package or digest information of the second installation package.

The communications module 1101 is further configured to receive a second message sent by the LPA, where the second message includes the differential installation package, and the second message is sent by the update server to the LPA.

The processing module 1102 is further configured to verify the digest data, and after the digest data is successfully verified, update firmware of the eUICC 110 based on the differential installation package.

The first installation package is an installation package corresponding to a current firmware version of the eUICC 110, and the second installation package is an installation package corresponding to an updated firmware version.

It should be noted that, for content not mentioned in the embodiment corresponding to FIG. 11 and a specific implementation of each module, reference may be made to the related descriptions in the method embodiment corresponding to FIG. 4A and FIG. 4B, or FIG. 5A and FIG. 5B. Details are not described again herein.

Figure 12:
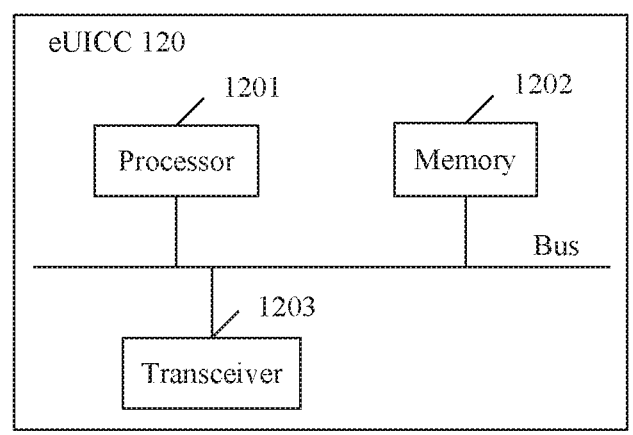
FIG. 12 is a schematic structural diagram of another eUICC according to an embodiment of this application.

In some feasible implementations, the processing module 1102 may be a processor or a processing chip, the communications module 1101 may be a transceiver, and the eUICC may further include a memory. FIG. 12 is a schematic structural diagram of another eUICC according to an embodiment of this application. As shown in FIG. 12, the eUICC 120 includes a processor 1201, a memory 1202, and a transceiver 1203, where the processor 1201, the memory 1202, and the transceiver 1203 are connected by one or more communications buses.

The processor 1201 is configured to support the eUICC in performing corresponding functions in the firmware update method shown in FIG. 4A and FIG. 4B, or FIG. 5A and FIG. 5B. The memory 1202 is configured to store program code and the like. The transceiver 1203 is configured to receive and send data.

The processor 1201 may invoke the program code stored in the memory 1202 or invoke the transceiver 1203 to perform the following operations: receiving a first message sent by a local profile assistant LPA, where the first message includes first data and a signature of the first data, and the first message is sent by an update server to the LPA;

verifying the first message, and after the first message is successfully verified, obtaining digest data included in the first data, where the digest data includes digest information of a differential installation package between a first installation package and a second installation package, and the digest data further includes at least one of digest information of the first installation package or digest information of the second installation package;

receiving a second message sent by the LPA, where the second message includes the differential installation package, and the second message is sent by the update server to the LPA; and verifying the digest data, and after the digest data is successfully verified, updating firmware of the eUICC 120 based on the differential installation package; where the first installation package is an installation package corresponding to a current firmware version of the eUICC 120, and the second installation package is an installation package corresponding to an updated firmware version.

It should be noted that, the processor 1201, the memory 1202, and the transceiver 1203 may perform the operations performed by the eUICC in the method embodiment corresponding to FIG. 4A and FIG. 4B, or FIG. 5A and FIG. 5B. For details, refer to the related descriptions in the method embodiment corresponding to FIG. 4A and FIG. 4B, or FIG. 5A and FIG. 5B. Details are not described again herein.

An embodiment of this application further provides a computer-readable storage medium, where the computer-readable storage medium stores a computer program, the computer program includes a program instruction, and when the program instruction is executed by a computer, the computer is enabled to perform the method in the embodiment corresponding to FIG. 4A and FIG. 4B, or FIG. 5A and FIG. 5B, where the computer is a part of the eUICC mentioned above.

An embodiment of this application further provides a computer program product, where the computer program product includes a program instruction, and when the program instruction is executed by a computer, the computer is enabled to perform the method in the embodiment corresponding to FIG. 4A and FIG. 4B, or FIG. 5A and FIG. 5B, where the computer program may be a part of a program stored in the memory 1202 mentioned above.

Figure 13:
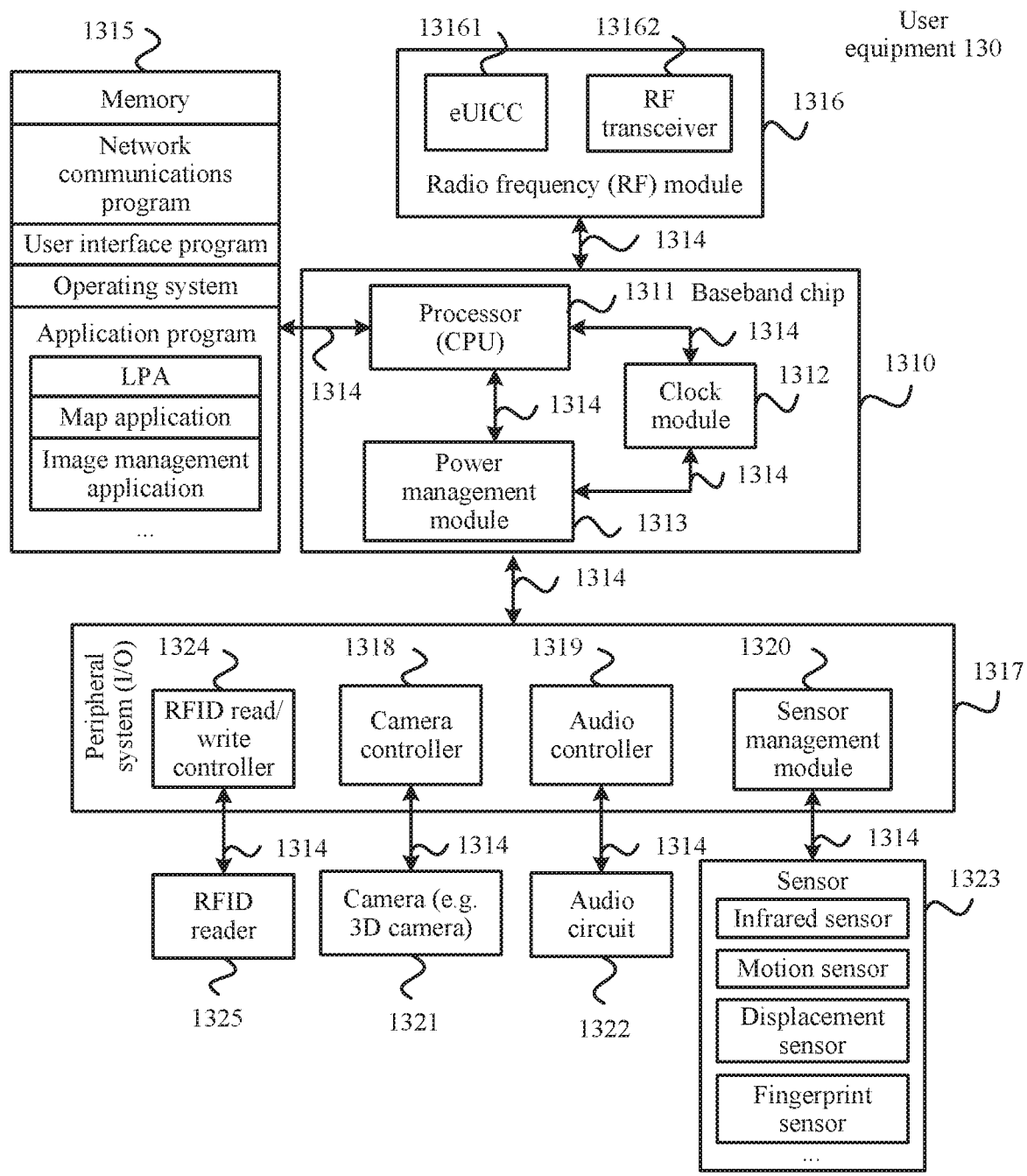
FIG. 13 is a structural block diagram of an implementation of user equipment according to an embodiment of this application.

FIG. 13 is a structural block diagram of an implementation of user equipment according to an embodiment of this application. As shown in FIG. 13, the user equipment 130 may include a baseband chip 1310, a memory 1315 (one or more computer-readable storage media), a radio frequency (RF) module 1316, and a peripheral system 1317. These components may communicate with each other over one or more communications buses 1314.

The peripheral system 1317 is mainly configured to implement a function of interaction between the user equipment 130 and a user or an external environment, and mainly includes an input/output apparatus of the user equipment 130. In a specific implementation, the peripheral system 1317 may include a camera controller 1318, an audio controller 1319, and a sensor management module 1320. Each controller may be coupled to a peripheral device corresponding to the controller (for example, a camera 1321, an audio circuit 1322, and a sensor 1323). In some embodiments, the camera 1321 may be a 3D camera. In some embodiments, the sensor 1323 may be an infrared sensor, a fingerprint sensor, a displacement sensor, a power consumption sensor, a temperature sensor, a humidity sensor, a light sensor, or the like. It should be noted that, the peripheral system 1317 may further include other/O peripherals. For example, the peripheral system 1317 further includes a radio frequency identification (Radio Frequency Identification, RFID) read/write controller 1324, where the RFID read/write controller is coupled to an RFID reader 1325.

The baseband chip 1310 may integrate and include a processor 1311, a clock module 1312, and a power management module 1313. The clock module 1312 integrated in the baseband chip 1310 is mainly configured to generate, for the processor 1311, a clock required for data transmission and time sequence control. The power management module 1313 integrated in the baseband chip 1310 is mainly configured to provide a stable high-precision voltage for the processor 1311, the radio frequency module 1316, and the peripheral system 1317. In some embodiments, the processor may be a central processing unit (Center Processor Unit, CPU), an embedded micro controller unit (Micro Controller Unit, MCU), an embedded micro processor unit (Micro Processor Unit, MPU), an embedded system on chip (System on Chip, SoC), or the like.

The radio frequency (RF) module 1316 is configured to receive and transmit radio frequency signals, and mainly integrates a receiver and a transmitter of the user equipment 130. The radio frequency (RF) module 1316 communicates with a communications network and another communications device by using radio frequency signals. In a specific implementation, the radio frequency (RF) module 1316 may include but is not limited to: an eUICC 13161, an antenna system, an RF transceiver 13162, one or more amplifiers, a tuner, one or more oscillators, a digital signal processor, a CODEC chip, a storage medium, and the like. In some embodiments, the radio frequency (RF) module 1316 may be implemented on a separate chip.

The memory 1315 is coupled to the processor 1311, and configured to store various software programs and/or a plurality of groups of commands. In a specific implementation, the memory 1315 may include a high-speed random access memory, and may also include a non-volatile memory, for example, one or more magnetic disk storage devices, a flash memory, or another non-volatile solid state storage device. The memory 1315 may store an operating system (referred to as a system for short hereinafter), for example, Android, IOS, or Windows, or an embedded operating system such as Linux. The memory 1315 may further store a network communications program. The network communications program may be configured to communicate with one or more adjuncts, one or more user equipments, or one or more network devices. The memory 1315 may further store a user interface program. The user interface program may display content of an application program visually and realistically by using a graphical operation interface, and receive a control operation of the user on the application program by using an input control such as a menu, a dialog box, or a key. The memory 1315 may further store one or more application programs including a local profile assistant LPA.

It should be noted that, the user equipment 130 may perform the operations performed by the user equipment in the method embodiment corresponding to FIG. 3, FIG. 4A and FIG. 4B, or FIG. 5A and FIG. 5B. For details, refer to the related descriptions in the method embodiment corresponding to FIG. 3, FIG. 4A and FIG. 4B, or FIG. 5A and FIG. 5B. Details are not described again herein.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor executes instructions in the memory and completes the steps in the foregoing methods in combination with hardware of the processor. To avoid repetition, details are not described again herein.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and modules can be implemented by electronic hardware, computer software, or a combination thereof. To clearly describe the interchangeability between the hardware and the software, the foregoing has generally described steps and composition of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and module, reference may be made to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or may not be performed. In addition, the displayed or discussed mutual couplings or direct couplings or communications connections may be implemented by using some interfaces. Indirect couplings or communications connections between the apparatuses or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions in the embodiments of this application.

In addition, functional modules in the embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A firmware update method implemented by a user equipment, the firmware update method comprising:
receiving a first message from an update server, wherein the first message comprises first data and a signature of the first data;
verifying the first message;
digest data from the first data after the first message is successfully verified, wherein the digest data comprises first digest information of a differential installation package between a first installation package and a second installation package and at least one of second digest information of the first installation package or third digest information of the second installation package, wherein the first installation package corresponds to a current firmware version of the user equipment, and wherein the second installation package corresponds to an updated firmware version of the user equipment;
receiving a second message from the update server, wherein the second message comprises the differential installation package,
verifying the digest data; and
firmware of an embedded universal integrated circuit card (eUICC) based on the differential installation package after the digest data is successfully verified.

2. The firmware update method of claim 1, further comprising:
obtaining fourth digest information of a third installation package, wherein the third installation package is locally stored by the user equipment and corresponding to the current firmware version of the user equipment;
comparing the fourth digest information with the second digest information;
obtaining fifth digest information of the differential installation package comprised in the second message when the fourth digest information is the same as the second digest information;
comparing the first digest information with the fifth digest information; and
determining that the digest data is successfully verified when the first digest information is the same as the fifth digest information.

3. The firmware update method of claim 1, further comprising:

obtaining fourth digest information of the differential installation package comprised in the second message;

comparing the first digest information with the fourth digest information;

obtaining a third installation package and fifth digest information of the third installation package when the first digest information is the same as the fourth digest information, wherein the third installation package is locally stored by the user equipment and corresponding to the current firmware version of the user equipment;

combining the third installation package with the differential installation package;

obtaining a fourth installation package and sixth digest information of the fourth installation package;

comparing the sixth digest information with the third digest information; and determining that the digest data is successfully verified when the sixth digest information is the same as the third digest information.

4. The firmware update method of claim 1, further comprising:

obtaining a third installation package and fourth digest information of the third installation package, wherein the third installation package is locally stored by the user equipment and corresponding to the current firmware version of the user equipment;

comparing the fourth digest information with the second digest information;

obtaining fifth digest information of the differential installation package in the second message when the fourth digest information is the same as the second digest information;

comparing the first digest information with the fifth digest information;

when the first digest information is the same as the fifth digest information:
combining the third installation package with the differential installation package; and
obtaining a fourth installation package and sixth digest information of the fourth installation package;

comparing the sixth digest information with the third digest information; and determining that the digest data is successfully verified when the sixth digest information is the same as the third digest information.

5. The firmware update method of claim 1, wherein the differential installation package and the digest data are stored in the update server.

6. The firmware update method of claim 1, wherein before receiving the first message, the firmware update method further comprises:

receiving a target event record and an address of the update server from an event management server based on an eUICC identity of the user equipment, wherein the target event record instructs the user equipment to perform a firmware update operation;

sending a third message to the update server based on the address of the update server, wherein the third message comprises the eUICC identity; and receiving the first message from the update server based on the eUICC identity.

7. The firmware update method of claim 1, wherein before receiving the second message, the firmware update method further comprises:

sending a fourth message to the update server based on a pre-obtained address of the update server, wherein the fourth message comprises second data, a signature of the second data, and eUICC information, and wherein the fourth message enables the update server to search a pre-generated software package list based on the eUICC information to obtain the differential installation package comprised in the second message; and receiving the second message from the update server after the fourth message is successfully verified.

8. The firmware update method of claim 1, wherein after updating the firmware of the eUICC, the firmware update method further comprises:

obtaining fourth digest information of an installation package corresponding to an updated firmware version of the eUICC; and storing the fourth digest information.

9. A firmware update method implemented by an update server, the firmware update method comprising:

sending a first message to a user equipment, wherein the first message comprises first data and a signature of the first data, wherein the first data comprises digest data, wherein the digest data comprises first digest information of a differential installation package between a first installation package and a second installation package and at least one of second digest information of the first installation package or third digest information of the second installation package, wherein the first installation package corresponds to a current firmware version of the user equipment, and wherein the second installation package corresponds to an updated firmware version of the user equipment; and sending a second message comprising the differential installation package to the user equipment to enable the user equipment to update firmware of an embedded universal integrated circuit card (eUICC) based on the digest data using the differential installation package.

10. The firmware update method of claim 9, further comprising storing the differential installation package and the digest data.

11. The firmware update method of claim 9, wherein before sending the first message, the firmware update method further comprises:

receiving a third message from the user equipment based on a pre-obtained address of the update server, wherein the third message comprises an eUICC identity of the user equipment;

determining the first message based on the eUICC identity; and sending the first message to the user equipment.

12. The firmware update method of claim 9, wherein before sending the second message, the firmware update method further comprises:

receiving a fourth message from the user equipment based on a pre-obtained address of the update server, wherein the fourth message comprises second data, a signature of the second data, and eUICC information;

verifying, the fourth message;

searching a pre-generated software package list based on the eUICC information to obtain the differential installation package; and sending the second message to the user equipment, wherein the second message comprises the differential installation package.

13. A user equipment, comprising:
a receiver configured to receive a first message from an update server, wherein the first message comprises first data and a signature of the first data;
a processor coupled to the receiver and configured to:
verify the first message; and obtain digest data from the first data after the first message is successfully verified, wherein the digest data comprises first digest information of a differential installation package between a first installation package and a second installation package and at least one of second digest information of the first installation package or third digest information of the second installation package, wherein the first installation package corresponds to a current firmware version of the user equipment, and wherein the second installation package corresponds to an updated firmware version of the user equipment, wherein the receiver is further configured to receive a second message from the update server, wherein the second message comprises the differential installation package, and wherein the processor is further configured to:
verify the digest data; and
update firmware of an embedded universal integrated circuit card (eUICC) based on the differential installation package after the digest data is successfully verified.

14. The user equipment of claim 13, wherein the processor is further configured to:
obtain fourth digest information of a third installation package, wherein the third installation package is locally stored by the user equipment and corresponding to the current firmware version of the user equipment;
compare the fourth digest information with the second digest information;
obtain fifth digest information of the differential installation package in the second message when the fourth digest information is the same as the second digest information;
compare the first digest information with the fifth digest information; and
determine that the digest data is successfully verified when the first digest information is the same as the fifth digest information.

15. The user equipment of claim 13, wherein the processor is further configured to:
obtain fourth digest information of the differential installation package in the second message;
compare the first digest information with the fourth digest information;
obtain a third installation package and fifth digest information of the third installation package when the first digest information is the same as the fourth digest information, wherein the third installation package is locally stored by the user equipment and corresponding to the current firmware version of the user equipment;
combine the third installation package with the differential installation package;
obtain a fourth installation package and sixth digest information of the fourth installation package;
compare the sixth digest information with the third digest information; and
determine that the digest data is successfully verified when the sixth digest information is the same as the third digest information.

16. The user equipment of claim 13, wherein the processor is further configured to:
obtain a third installation package and fourth digest information of the third installation package, wherein the third installation package is locally stored by the user equipment and corresponding to the current firmware version of the user equipment;
compare the fourth digest information with the second digest information;
obtain fifth digest information of the differential installation package in the second message when the fourth digest information is the same as the second digest information;
compare the first digest information with the fifth digest information;
when the first digest information is the same as the fifth digest information:
combine the third installation package with the differential installation package; and
obtain a fourth installation package and sixth digest information of the fourth installation package;
compare the sixth digest information with the third digest information; and
determine that the digest data is successfully verified when the sixth digest information is the same as the third digest information.

17. The user equipment of claim 13, wherein the differential installation package and the digest data are stored in the update server.

18. The user equipment of claim 13, wherein receiver is further configured to receive a target event record and an address of the update server from an event management server based on an eUICC identity of the user equipment, wherein the target event record instructs the user equipment to perform a firmware update operation wherein the user equipment further comprises a transmitter coupled to the receiver and the processor and configured to send a third message to the update server based on the address of the update server, wherein the third message comprises the eUICC identity, and wherein the receiver is further configured to receive the first message from the update server based on the eUICC identity.

19. The user equipment of claim 13, further comprising a transmitter coupled to the receiver and the processor and configured to send a fourth message to the update server based on a pre-obtained address of the update server, wherein the fourth message comprises second data, a signature of the second data, and eUICC information, wherein the fourth message enables the update server to search a pre-generated software package list based on the eUICC information to obtain the differential installation package in the second message, and wherein the receiver is further configured to receive the second message from the update server after the fourth message is successfully verified.

20. The user equipment of claim 13, wherein the processor is further configured to:
obtain fourth digest information of an installation package corresponding to a updated firmware version of the eUICC; and
store the fourth digest information.

* * * * *

UNITED STATES PATENT AND TRADEMARK OFFICE
CERTIFICATE OF CORRECTION

PATENT NO. : 10,983,783 B2  
APPLICATION NO. : 16/643408  
DATED : April 20, 2021  
INVENTOR(S) : Yajun Zhang and Shuiping Long It is certified that error appears in the above-identified patent and that said Letters Patent is hereby corrected as shown below:

In the Claims

Claim 1, Column 38, Line 30: "digest data from" should read "obtaining digest data from"

Claim 1, Column 38, Line 46: "firmware of an embedded universal" should read "updating firmware of an embedded universal"

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*